US012753314B2

(12) United States Patent
Miller et al.

(10) Patent No.: US 12,753,314 B2
(45) **Date of Patent: *Oct. 6, 2026**

(54) CO-CURABLE AND CO-CURED UV/VISIBLE LIGHT-RESISTANT LIGHTNING STRIKE PROTECTION MATERIAL FOR COMPOSITE MATERIAL ASSEMBLIES

(71) Applicant: The Boeing Company, Chicago, IL (US)

(72) Inventors: Melinda D. Miller, Snohomish, WA (US); Patrice K. Ackerman, Kent, WA (US); Jason A. Bolles, Kent, WA (US)

(73) Assignee: THE BOEING COMPANY, Arlington, VA (US)

( * ) Notice: Subject to any disclaimer, the term of this patent is extended or adjusted under 35 U.S.C. 154(b) by 1001 days.

This patent is subject to a terminal disclaimer.

(21) Appl. No.: 17/870,041

(22) Filed: Jul. 21, 2022

(65) Prior Publication Data

US 2024/0026164 A1 Jan. 25, 2024

(51) Int. Cl.

| | |
|---|---|
| ***C09D 5/33*** | (2006.01) |
| ***C08K 3/013*** | (2018.01) |
| ***C08K 3/04*** | (2006.01) |
| ***C09D 5/00*** | (2006.01) |
| ***C09D 5/24*** | (2006.01) |
| ***C09D 7/61*** | (2018.01) |

(52) U.S. Cl.

CPC .............. *C09D 5/004* (2013.01); *C08K 3/013* (2018.01); *C08K 3/04* (2013.01); *C09D 5/002* (2013.01); *C09D 5/24* (2013.01); *C09D 7/61* (2018.01)

(58) Field of Classification Search

CPC .......... C09D 5/004; C09D 5/002; C09D 5/24; C09D 7/61; C08K 3/013; C08K 3/04

See application file for complete search history.

(56) References Cited

U.S. PATENT DOCUMENTS

| | | | |
|---|---|---|---|
| 7,070,850 | B2 | 7/2006 | Dietz et al. |
| 7,323,248 | B2 | 1/2008 | Ramsey |
| 8,158,245 | B2 | 4/2012 | Pratte et al. |
| 8,178,606 | B2 | 5/2012 | Sang et al. |

(Continued)

FOREIGN PATENT DOCUMENTS

| | | | |
|---|---|---|---|
| CN | 1191926 | C | 3/2005 |
| CN | 106221533 | A | 12/2016 |

(Continued)

OTHER PUBLICATIONS

EP Search Report mailed Aug. 23, 2023 in re EP Application No. 22212766.4.

(Continued)

*Primary Examiner* — Jeremy R Pierce

(74) *Attorney, Agent, or Firm* — COATS & BENNETT, PLLC

(57) ABSTRACT

Co-curable and co-cured UV/visible light-resistant composite material assemblies comprising a co-curable UV/visible light-resistant lightning strike protection layer are disclosed that can facilitate and streamline manufacture of composite material assemblies and sub-assemblies, including exterior assemblies and sub-assemblies for aircraft, vehicles, and objects exposed to electromagnetic effects including lightning strikes.

27 Claims, 16 Drawing Sheets

(56) References Cited

U.S. PATENT DOCUMENTS

| | | | | |
|---|---|---|---|---|
| 8,685,544 | B2 | 4/2014 | Larson-Smith et al. | |
| 8,947,847 | B2 | 2/2015 | Langone et al. | |
| 9,676,961 | B2 | 6/2017 | Sang et al. | |
| 9,802,714 | B2 | 10/2017 | Gerken et al. | |
| 9,912,137 | B2 | 3/2018 | Le et al. | |
| 10,525,667 | B2 | 1/2020 | Hebert et al. | |
| 10,906,211 | B2 | 2/2021 | Sang et al. | |
| 11,752,708 | B2 | 9/2023 | Ackerman et al. | |
| 12,350,892 | B2 * | 7/2025 | Adjorlolo | C08J 5/042 |
| 12,350,915 | B2 * | 7/2025 | Ackerman | B32B 7/08 |
| 12,377,949 | B2 * | 8/2025 | Adjorlolo | C08L 63/00 |
| 12,466,574 | B2 * | 11/2025 | Ackerman | B64C 3/34 |
| 2010/0151186 | A1 | 6/2010 | Hebert | |
| 2012/0145319 | A1 | 6/2012 | Schaaf et al. | |
| 2014/0141242 | A1 | 5/2014 | Phillips et al. | |
| 2017/0043529 | A1 | 2/2017 | Sanderson | |
| 2018/0346146 | A1 | 12/2018 | Sang et al. | |
| 2019/0027913 | A1 * | 1/2019 | Sang | B32B 27/38 |
| 2019/0210338 | A1 | 7/2019 | Childers et al. | |
| 2019/0233946 | A1 | 8/2019 | Bruton et al. | |
| 2020/0070998 | A1 | 3/2020 | Ayyadurai et al. | |
| 2020/0156330 | A1 | 5/2020 | Ogale | |
| 2020/0165005 | A1 | 5/2020 | Christy et al. | |
| 2020/0316823 | A1 | 10/2020 | Sang et al. | |
| 2021/0008855 | A1 | 1/2021 | Sang et al. | |
| 2021/0016319 | A1 | 1/2021 | Brei et al. | |
| 2021/0016553 | A1 | 1/2021 | Brei et al. | |
| 2021/0031942 | A1 | 2/2021 | Brei et al. | |
| 2021/0060607 | A1 | 3/2021 | Brei et al. | |
| 2021/0122891 | A1 | 4/2021 | Zhu et al. | |
| 2021/0367416 | A1 | 11/2021 | Hebert | |
| 2023/0080641 | A1 | 3/2023 | Ackerman et al. | |
| 2024/0026164 | A1 | 1/2024 | Miller et al. | |

FOREIGN PATENT DOCUMENTS

| | | | |
|---|---|---|---|
| CN | 106366996 | A | 2/2017 |
| EP | 3397556 | A1 | 11/2018 |
| EP | 3036049 | B1 | 5/2019 |
| EP | 3766683 | A1 | 1/2021 |
| IN | 201911023774 | A | 12/2020 |
| JP | 2012240610 | A | 12/2012 |
| WO | 2021003047 | A1 | 1/2021 |
| WO | 2021037889 | A1 | 3/2021 |

OTHER PUBLICATIONS

EP Search Report mailed Aug. 25, 2023 in re EP Application No. 22212768.0.

EP Search Report mailed Aug. 25, 2023 in re EP Application No. 22212773.0.

Bedel, V., et al., "Innovative conductive polymer composite coating for aircrafts lightning strike protection", Journal of Applied Polymer Science, Nov. 15, 2019, pp. 1-13, vol. 137, issue No. 20.

Guo, Y., et al., "Implementation of fiberglass in carbon fiber composites as an isolation layer that enhances lightning strike protection", Composites Science and Technology, Feb. 23, 2019, pp. 117-124, vol. 174.

EP Search Report mailed Nov. 8, 2023 in re EP App No. 23186786.2.

EP Search Report mailed Sep. 23, 2024 in re EP Application No. 24165716.2.

* cited by examiner

CO-CURABLE AND CO-CURED UV/VISIBLE LIGHT-RESISTANT LIGHTNING STRIKE PROTECTION MATERIAL FOR COMPOSITE MATERIAL ASSEMBLIES

TECHNOLOGICAL FIELD

The present disclosure relates, generally, to the field of composite materials, and composite material assemblies used for manufacturing large structural components. More specifically, the present disclosure relates to the field of composite materials and composite material assemblies used as structural materials for vehicles including aircraft.

BACKGROUND

The use of composite materials in the manufacture of various structural component parts continues to increase. At least due to the strength-to-weight ratios, composite materials offer advantages as replacements for denser materials, such as, for example, metals, metal alloys, etc., where the overall weight of a completed structure (or the weight of a component part of a completed structure) is an important consideration in the selection of materials used in the manufacture of such a completed structure, or in the manufacture of a component of a completed structure.

Coating layers applied to composite materials often are not as durable as, or have the longevity of, the composite materials to which such coating layers are applied. Composite material assemblies may otherwise comprise external or internal layers that can include, for example, protective coatings or other coating layers. For example, when composite materials are used in the fabrication of vehicles including, for example, aircraft, exterior paint coatings, referred to as an aircraft "livery", may require alteration, rework, change of logo, design, color scheme, etc., over the useful life of the vehicle. Such livery alteration, for example, may include the removal of one or more decorative coating layers applied onto a composite material, including, for example, one or more paint layers. However, the removal of one layer or layer type (paint, primer, adhesion promoting layer, adhesive layer, etc.) from materials stacked onto a composite material can require the removal of additional layers or layer types that then must be built back up, or otherwise reconstituted. In addition, livery alteration or other rework requiring paint removal via use of paint removal techniques can damage underlying layers, or even damage composite materials (e.g., if the composite materials are exposed to excessive mechanical paint removal techniques).

Further, composite components made from composite materials used in the manufacture of larger structures (e.g., aircraft, etc.) may encounter electromagnetic effects (EMEs) during operation, including, for example, and without limitation, lightning strikes, static electricity buildup, etc. When such a structure encounters an EME, the electric current delivered to the structure can travel through the structure and damage dielectric (e.g., insulating) material including, for example, composite substrate structural materials and insulative coatings on the composite substrate structural materials.

Unless explicitly identified as such, no statement herein is admitted as prior art merely by its inclusion in the Technological Field and/or Background section.

SUMMARY

Present aspects are directed to co-curable and co-cured composite materials comprising a co-curable or co-cured layer of UV/visible light-resistant lightning strike protection material layer to form a co-curable or co-cured composite material assembly comprising a co-curable or co-cured UV/visible light-resistant lightning-strike protection layer. Present aspects further comprise incorporating a second co-curable UV/visible light-resistant material into the co-curable composite material assembly comprising a co-curable UV/visible light-resistant lightning-strike protection layer. The incorporation into the co-curable or co-cured composite structural material substrate of the co-curable or co-cured UV/visible light-resistant layer and the co-curable or co-cured UV/visible light-resistant lightning strike protection material layer can, for example, significantly impact composite material manufacture and improve the performance and reduce the weight of the structural composite material by, at least, obviating the need to include separate UV/visible light-resistant coatings, paints, primers, etc., that were formerly applied to composite material substrates, such as, in the preparation of a composite material system used in structural assemblies for larger components, including internal and exterior surfaces of vehicles, including, for example, aircraft.

According to present aspects, a co-curable composite material assembly is disclosed, with the co-curable composite material assembly including a co-curable composite material substrate, a co-curable UV/visible light-resistant lightning strike protection layer; and wherein the co-curable composite material substrate is co-curable with the co-curable UV/visible light-resistant lightning strike protection layer at a temperature ranging from about 250° F. to about 370° F.

In another aspect, the co-curable composite material substrate includes a carbon fiber reinforced polymer.

In another aspect, the co-curable composite material substrate includes an epoxy resin-based compound, with the co-curable composite material substrate further including at least one of: carbon fibers, boron fibers, aramid fibers, fiberglass fibers, polyester fibers, and combinations thereof.

In another aspect, the co-curable composite material substrate comprises a plurality of carbon fiber reinforced polymer prepregs.

In a further aspect, the co-curable composite material substrate is in direct contact with and located immediately adjacent to the co-curable UV/visible light-resistant lightning strike protection layer.

In another aspect, a co-curable composite material assembly comprises a second co-curable UV/visible light-resistant layer as a separate layer in the co-curable composite material assembly.

In a further aspect, at least one of the co-curable UV/visible light-resistant lightning strike protection layer and the second co-curable UV/visible light-resistant layer comprises at least one of fiberglass, carbon fibers, polyester fibers, aramid fibers, quartz, and combinations thereof.

In another aspect, at least one of the co-curable UV/visible light-resistant lightning strike protection layer and the second co-curable UV/visible light-resistant layer is a co-curable UV/visible light-resistant fiberglass-containing layer.

In another aspect, the co-curable composite material assembly further includes as a separate layer, a co-curable UV/visible light-resistant layer that comprises in a single material layer both the second co-curable UV/visible light-resistant layer and the co-curable UV/visible light-resistant lightning strike protection layer with the co-curable composite material assembly co-curable at a temperature ranging from about 250° F. to about 370° F.

In another aspect, the second co-curable UV/visible light-resistant layer is located immediately adjacent to the co-curable material substrate, with the second co-curable UV/visible light-resistant layer further configured to be located between the co-curable composite material substrate and the co-curable UV/visible light-resistant lightning strike protection layer.

In another aspect, the co-curable UV/visible light-resistant lightning strike protection layer is applied as a single ply to the co-curable composite material substrate.

In another aspect, the co-curable UV/visible light-resistant lightning strike protection layer is applied as a single ply to the second co-curable UV/visible light resistant layer.

In another aspect, the second co-curable UV/visible light-resistant layer is applied as a single ply to the co-curable composite material substrate.

A further present aspect is directed to a co-cured composite material assembly, with the co-cured composite material assembly including a co-cured composite material substrate, and a co-cured UV/visible light-resistant lightning strike protection layer, and wherein the co-cured UV/visible light-resistant lightning strike protection layer has a UV/visible light transmittance value ranging from about 0% to about 20% UV/visible light transmittance for UV/visible light wavelengths ranging from about 200 nm to about 800 nm when the co-cured UV/visible light-resistant lightning strike protection layer comprises an average thickness ranging from about 2 mils to about 6 mils, and wherein the co-cured UV/visible light-resistant lightning strike protection layer comprises an electrical conductivity ranging from $2\times10^7$ Siemens/meter to $6.4\times10^7$ Siemens/meter.

In another aspect, the co-cured composite material substrate is co-curable with the co-curable UV/visible light-resistant lightning strike protection layer at a temperature ranging from about 250° F. to about 370° F.

In a further aspect, the co-cured composite material substrate comprises a carbon fiber reinforced polymer.

In another aspect, the co-cured composite material substrate comprises an epoxy resin-based compound, with the co-cured composite material substrate further comprising at least one of: carbon fibers, boron fibers, aramid fibers, fiberglass fibers, polyester fibers, and combinations thereof.

In another aspect, the co-cured composite material substrate is in direct contact with and located immediately adjacent to the co-cured UV/visible light-resistant lightning strike protection layer.

In a further aspect, an assembly primer layer is disposed onto the co-cured UV/visible light-resistant lightning strike protection layer, with the co-cured composite material assembly further comprising a topcoat layer disposed onto the assembly primer layer.

In another aspect, a detail primer layer is positioned between the co-cured UV/visible light-resistant lightning strike protection layer and the primer assembly layer.

In a further aspect, the co-cured composite material assembly further comprises a second co-cured UV/visible light-resistant layer, with both the co-cured UV/visible light-resistant layer and the co-cured UV/visible light-resistant lightning strike protection layer co-cured with the co-cured composite material substrate.

In another aspect, the second co-cured UV/visible light-resistant layer is located between the co-cured material substrate and the co-cured UV/visible light-resistant lightning strike protection layer.

In another aspect, the co-cured composite material assembly further comprises an assembly primer layer disposed onto the co-cured UV/visible light-resistant lightning strike protection layer, and with the co-cured composite material assembly further comprising a topcoat layer disposed onto the assembly primer layer.

In another aspect, the co-cured composite material assembly further comprises a detail primer layer disposed onto between the assembly primer layer and the co-cured UV/visible light-resistant lightning strike protection layer.

In a further aspect, the co-cured UV/visible light-resistant lightning strike protection layer is located between the co-cured material substrate and the second co-cured UV/visible light-resistant containing layer.

In another aspect, the co-cured UV/visible light-resistant lightning strike protection layer is located between the co-cured composite material substrate and the second co-cured UV/visible light-resistant, and the co-cured composite material assembly further comprises an assembly primer layer disposed onto the second co-cured UV/visible light-resistant layer, and with the co-cured composite material assembly further comprising a topcoat layer disposed onto the assembly primer layer.

In another aspect, the co-cured UV/visible light-resistant lightning strike protection layer is located between the co-cured material substrate and the second co-cured UV/visible light-resistant layer, and the co-cured composite material assembly further comprises an assembly primer layer disposed onto the second co-cured UV/visible light-resistant layer, the co-cured composite material assembly further comprises a topcoat layer disposed onto the assembly primer layer, and a detail primer layer is optionally disposed between the assembly primer layer and the second co-cured UV/visible light-resistant layer.

In another aspect, the second co-cured UV/visible light-resistant layer is a separate layer in the co-cured composite material assembly.

In a further aspect, at least one of the co-cured UV/visible light-resistant lightning strike protection layer and the second co-cured UV/visible light-resistant layer comprises at least one of fiberglass, carbon fibers, polyester fibers, aramid fibers, quartz, and combinations thereof.

In another aspect, at least one of the co-cured UV/visible light-resistant lightning strike protection layer and the co-cured UV/visible light-resistant layer comprises a co-cured UV/visible light-resistant fiberglass-containing layer.

In another aspect, the co-cured UV/visible light-resistant lightning strike protection layer is co-cured as a single ply to the co-cured composite material assembly.

In another aspect, the second co-cured UV/visible light-resistant layer is co-cured as a single ply in the co-cured composite material assembly.

According to further present aspects, a vehicle comprises the co-cured composite material assemblies, with the vehicle selected from the group consisting of: a crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle; a crewed surface water borne vehicle, an uncrewed waterborne vehicle, a crewed sub-surface water borne vehicle, an uncrewed sub-surface water borne vehicle, a satellite, and combinations thereof.

According to further present aspects, a method of making a co-curable composite material assembly is disclosed, with the method including providing a co-curable composite material substrate, and disposing a co-curable UV/visible light-resistant lightning strike protection layer to the co-curable composite material substrate to form a co-curable composite material lightning strike protection assembly, and wherein the co-curable composite material substrate is co-curable with the co-curable UV/visible light-resistant lightning strike protection layer at a temperature ranging from about 250° F. to about 370° F.

In another aspect, a method further includes positioning the co-curable UV/visible light-resistant lightning strike protection layer immediately adjacent the co-curable composite material substrate.

In a further aspect, a method further includes providing a co-curable UV/visible light-resistant fiberglass-containing layer to the co-curable composite material assembly.

In another aspect, a method further includes positioning the co-curable UV/visible light-resistant fiberglass-containing layer between the co-curable composite material substrate and the co-curable UV/visible light-resistant lightning strike protection layer.

In another aspect, a method further includes positioning the co-curable UV/visible light-resistant lightning strike protection layer in the co-curable composite material lightning strike protection assembly between the co-curable composite material substrate and the co-curable UV/visible light-resistant fiberglass-containing layer.

In a further aspect, a method further includes co-curing the co-curable composite material substrate lightning strike protection assembly at a temperature ranging from about 250° F. to about 370° F. to form a co-cured composite material assembly, and wherein the co-cured UV/visible light-resistant lightning strike protection layer comprises an electrical conductivity ranging from $2\times10^7$ Siemens/meter to $6.4\times10^7$ Siemens/meter.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
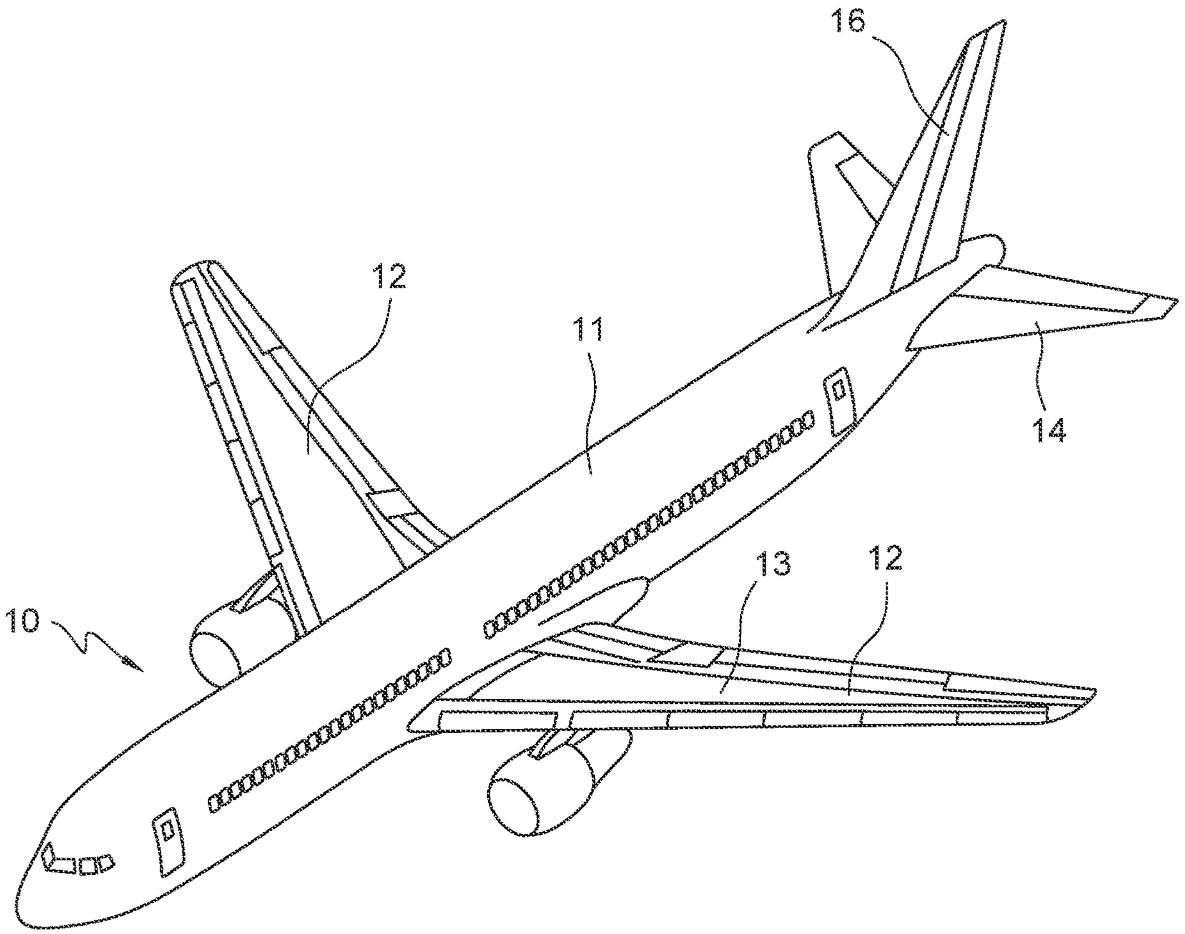
Figure 2A:
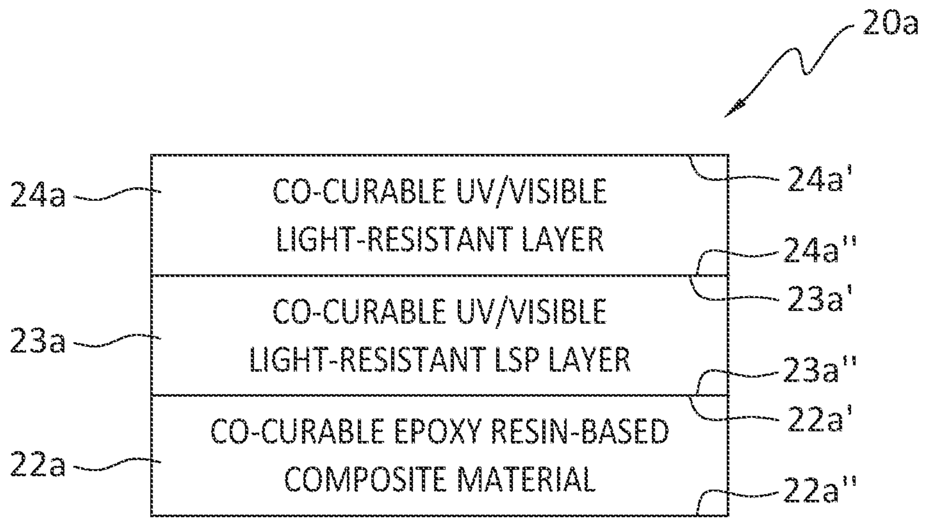
Figure 2B:
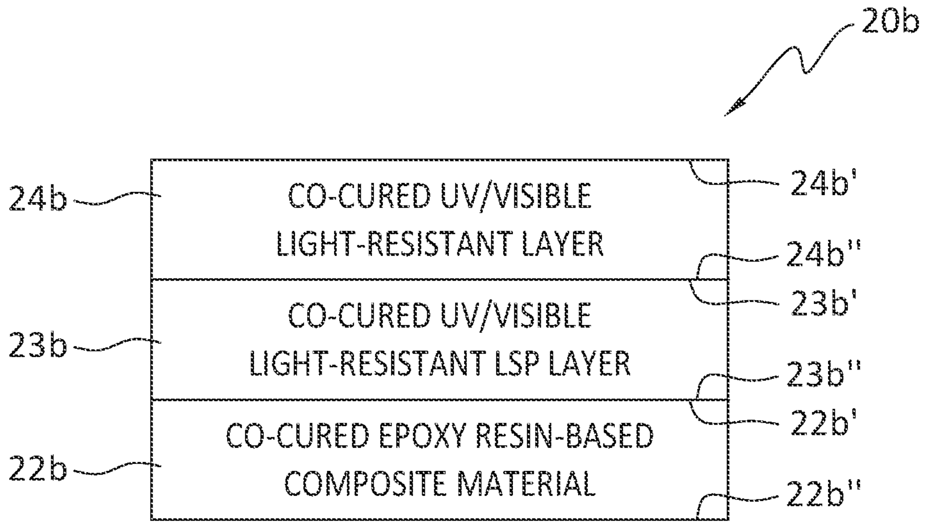
Figure 3A:
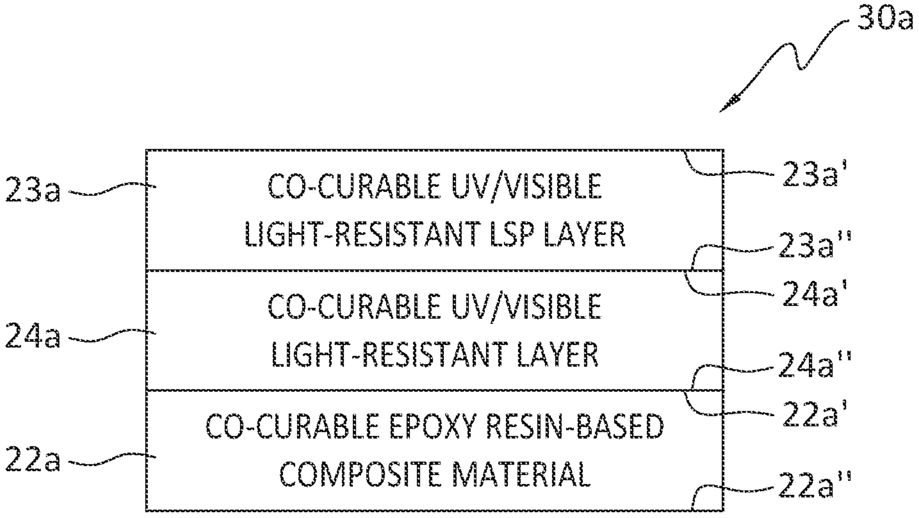
Figure 3B:
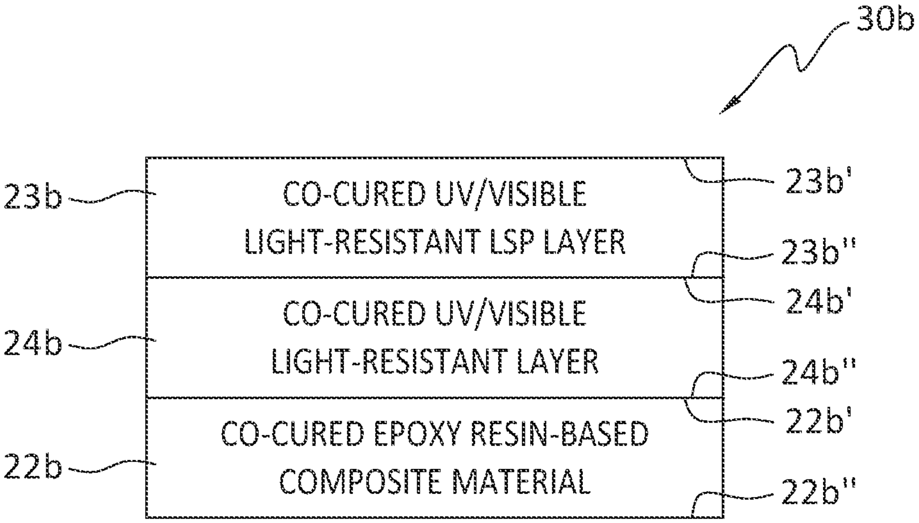
Figure 4A:
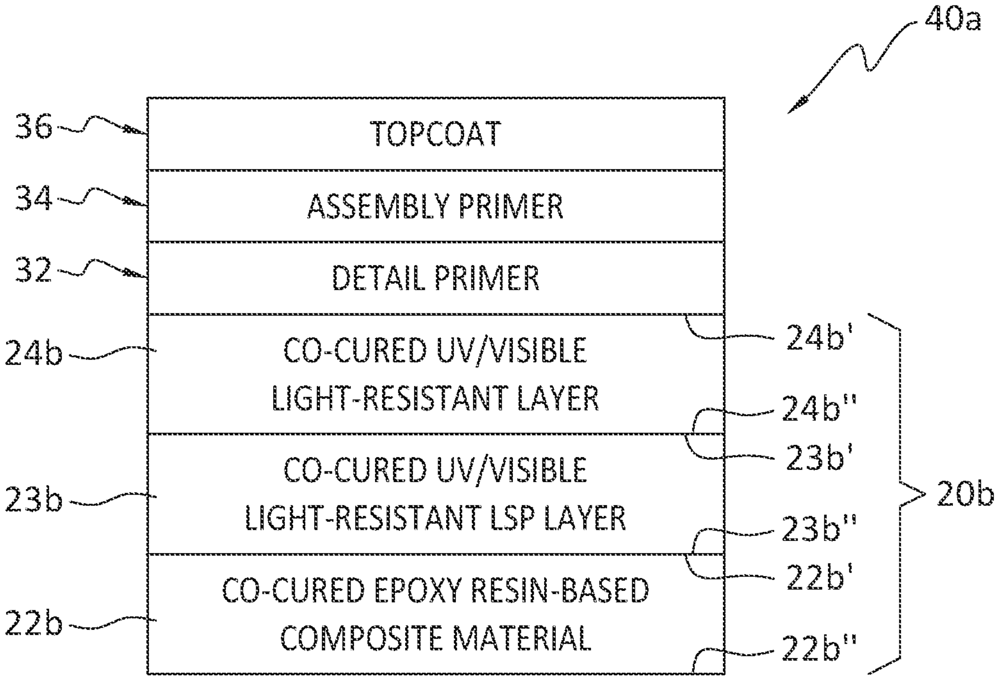
Figure 4B:
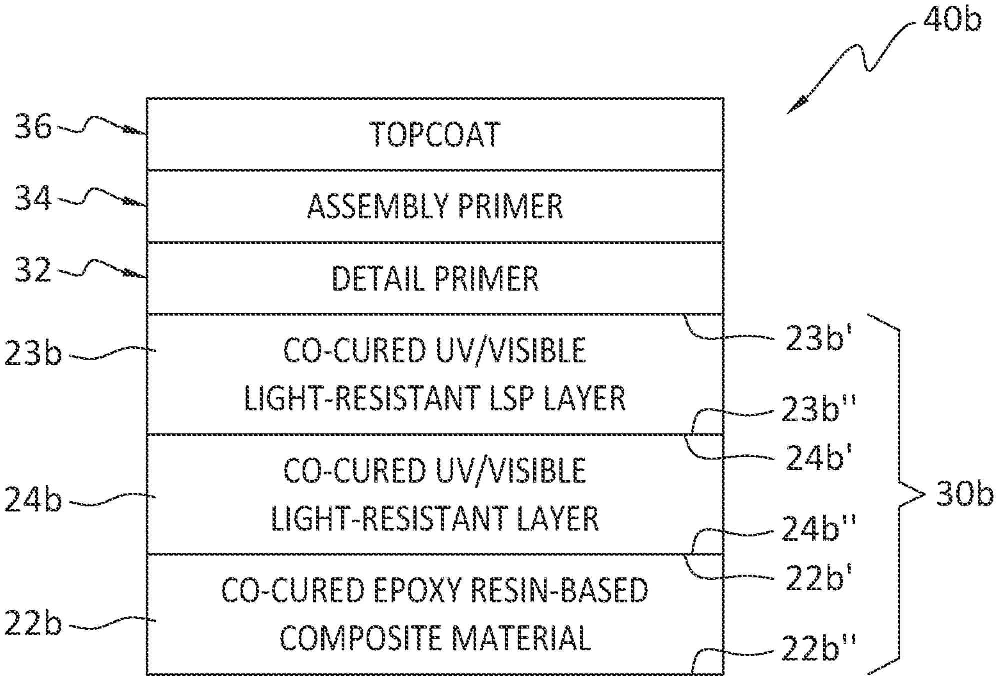
Figure 5A:
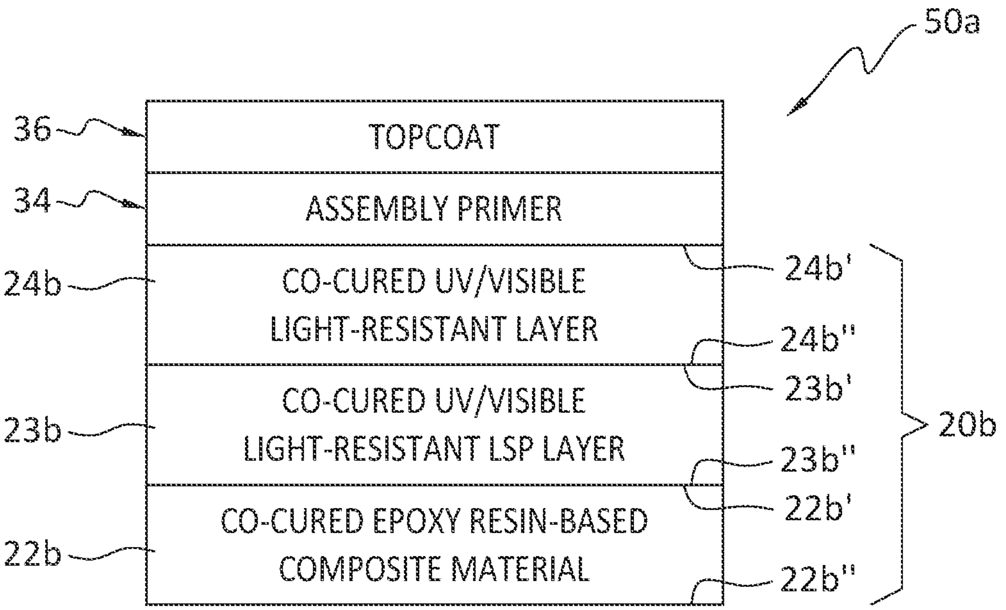
Figure 5B:
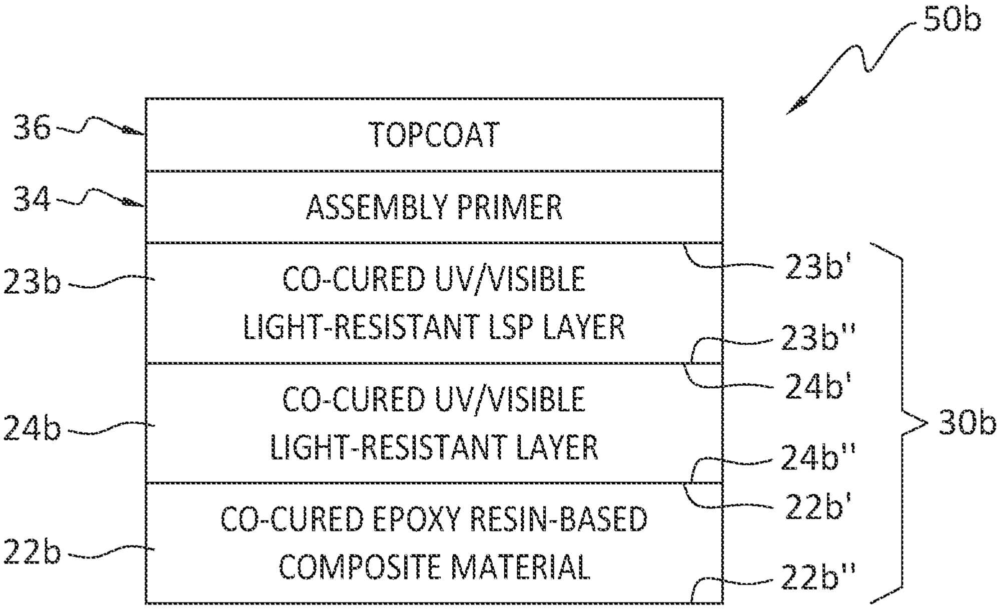
Figure 6A:
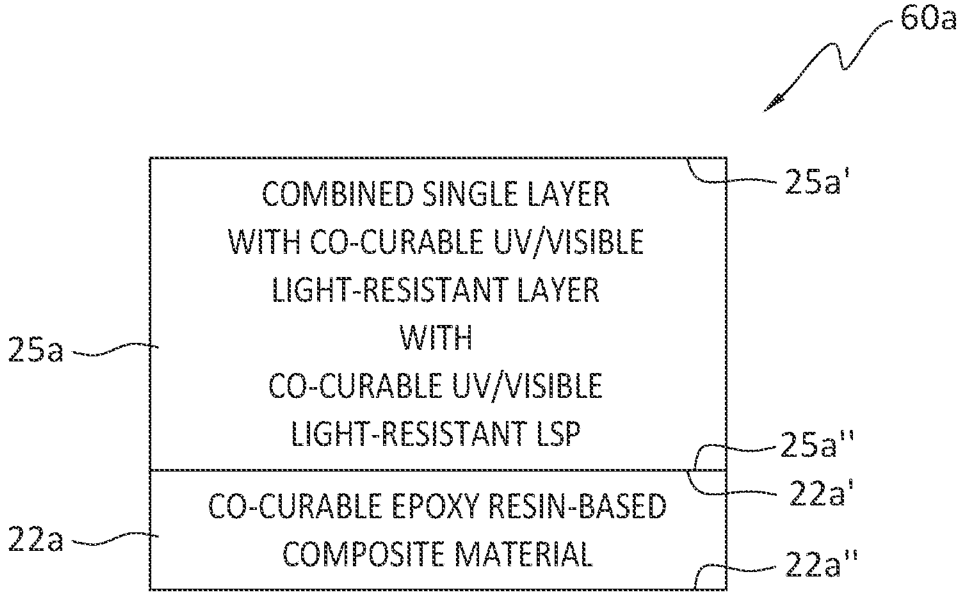
Figure 6B:
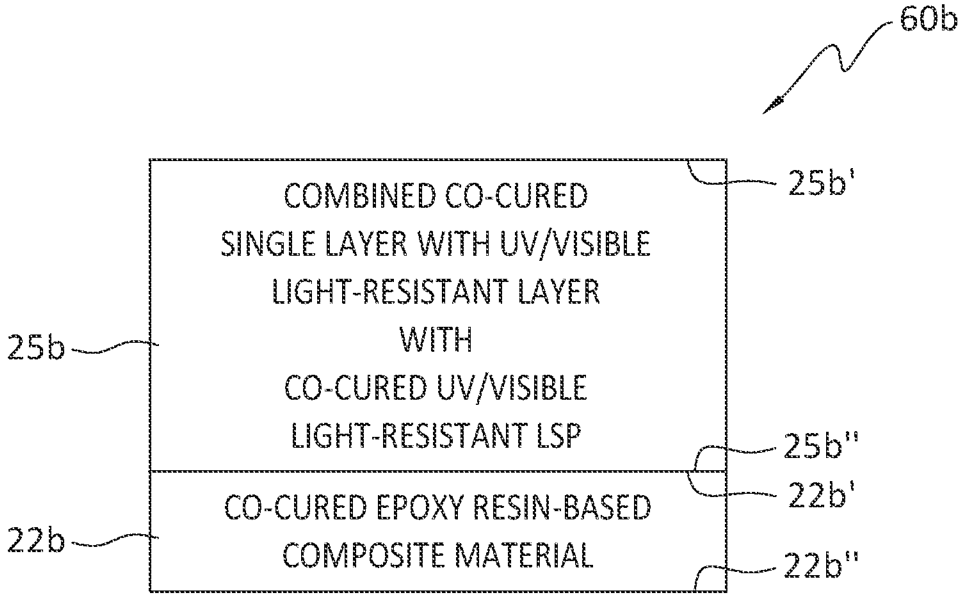
Figure 7:
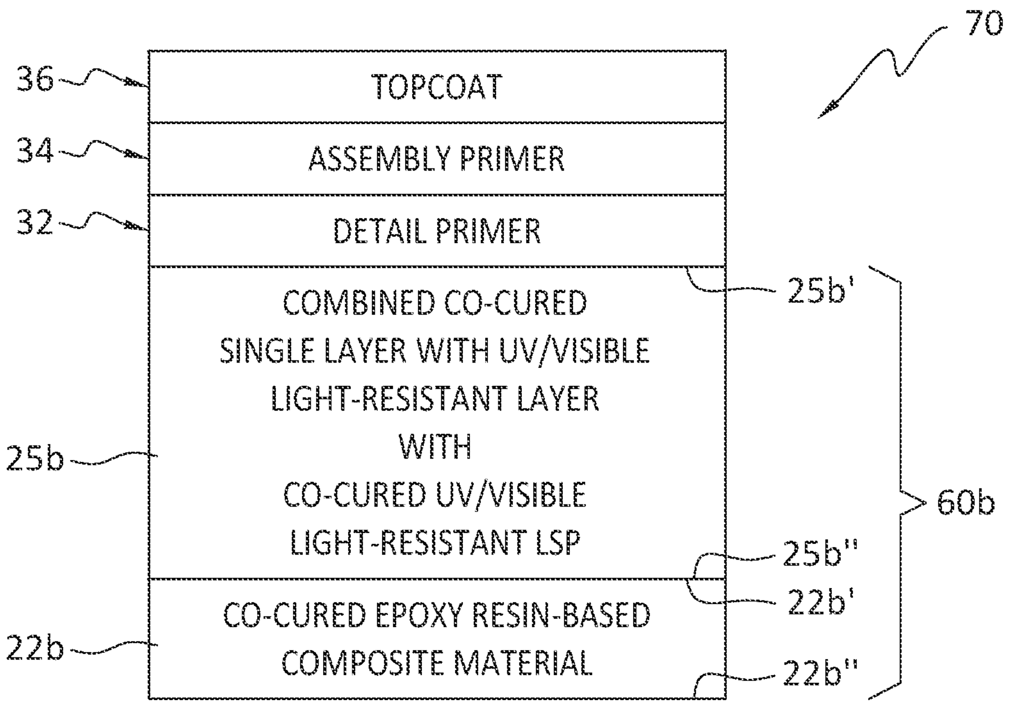
Figure 8:
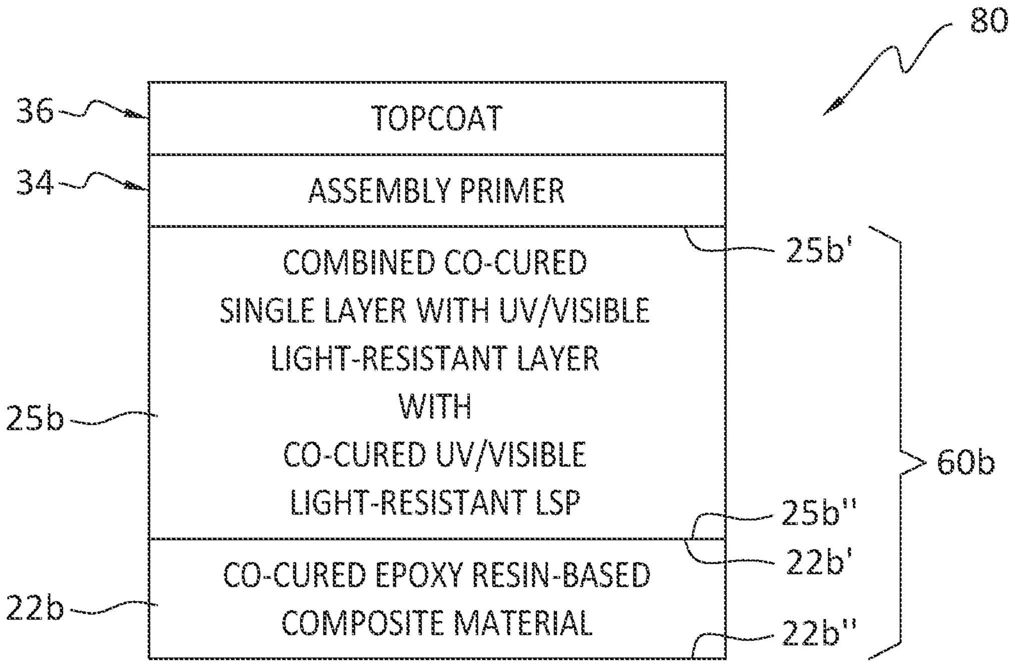
Figure 9A:
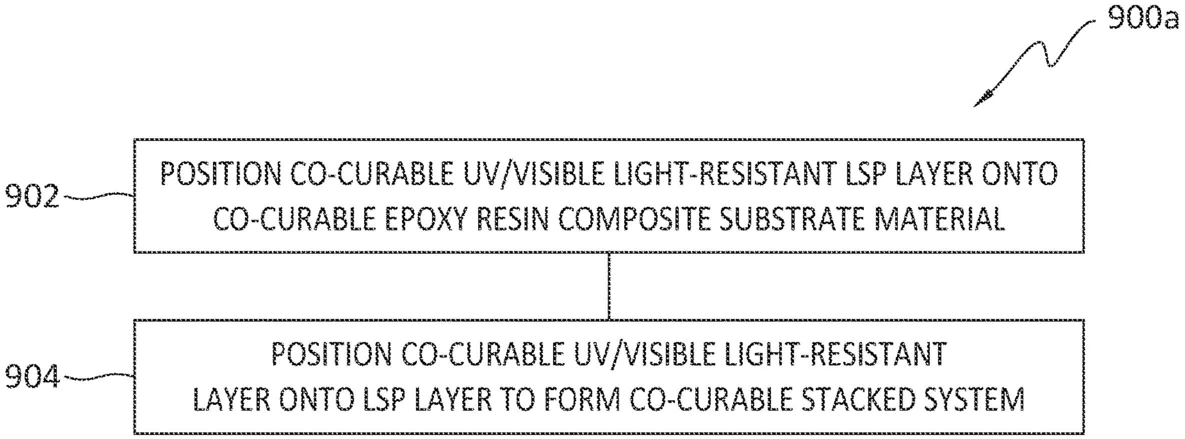
Figure 9B:
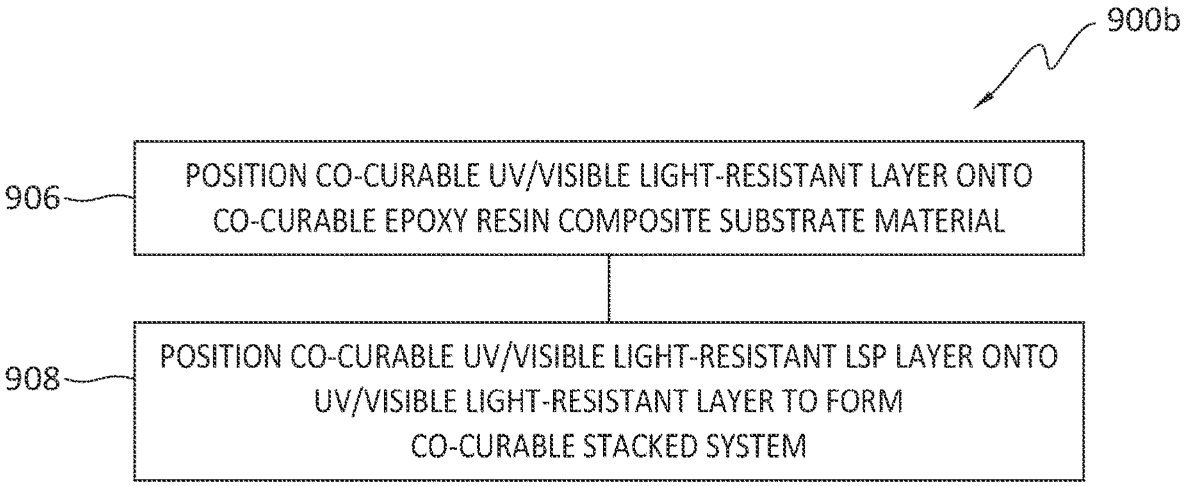
Figure 10A:
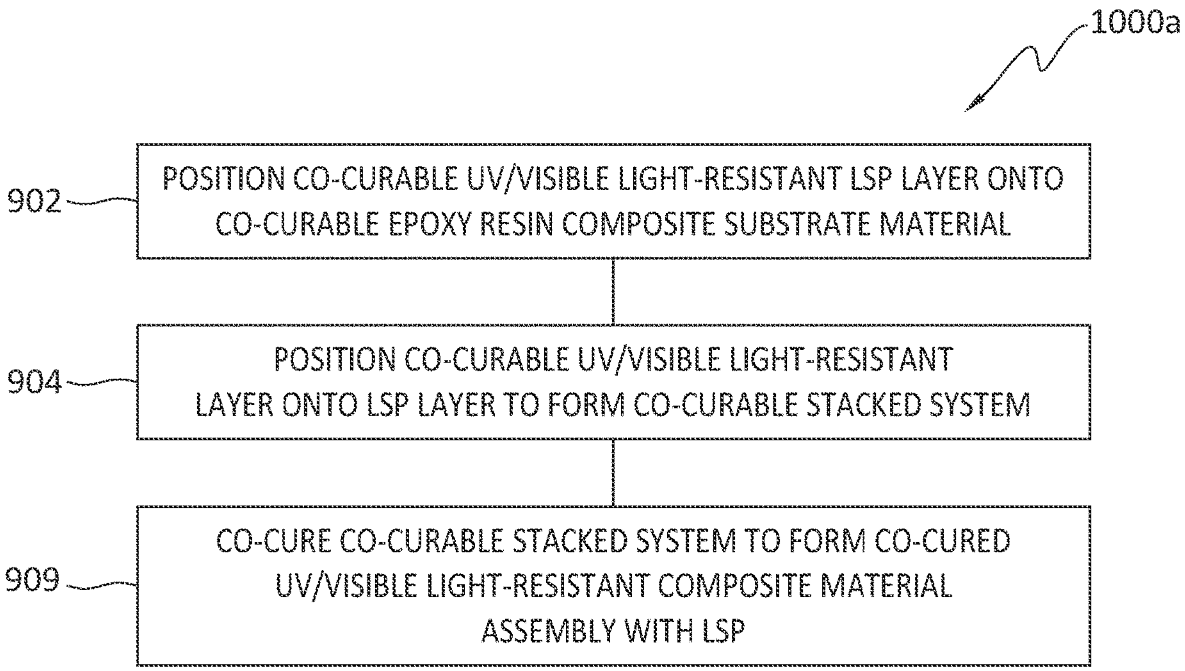
Figure 10B:
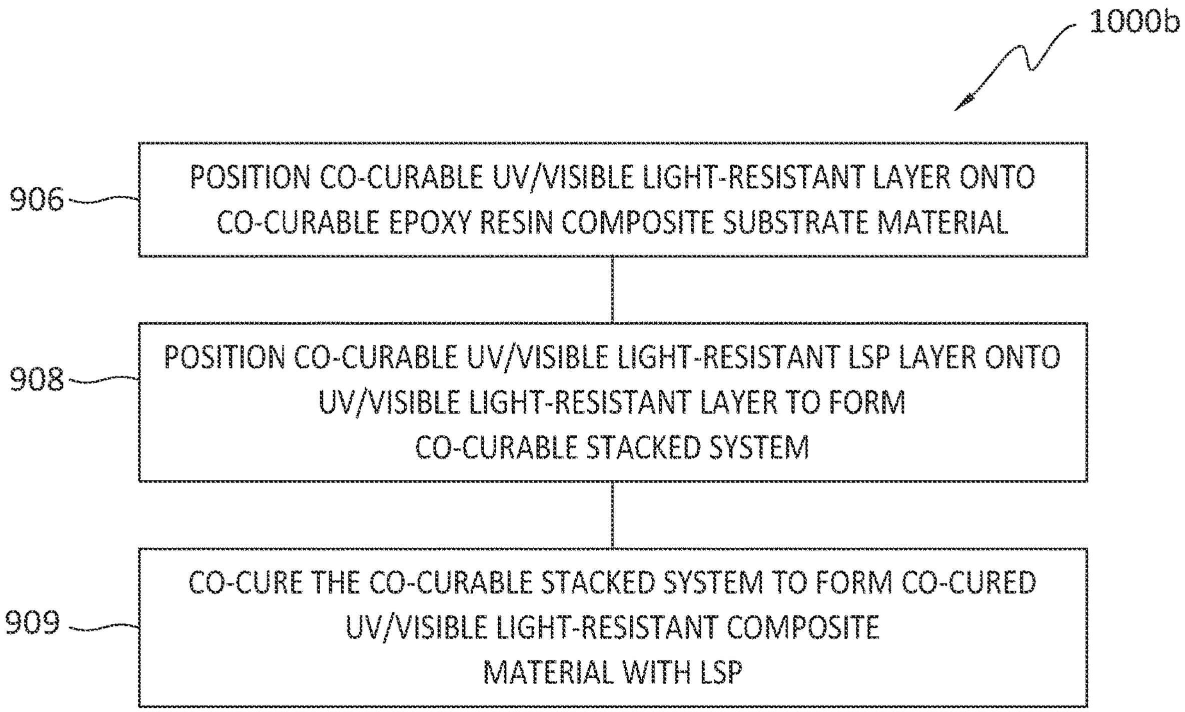
Figure 11A:
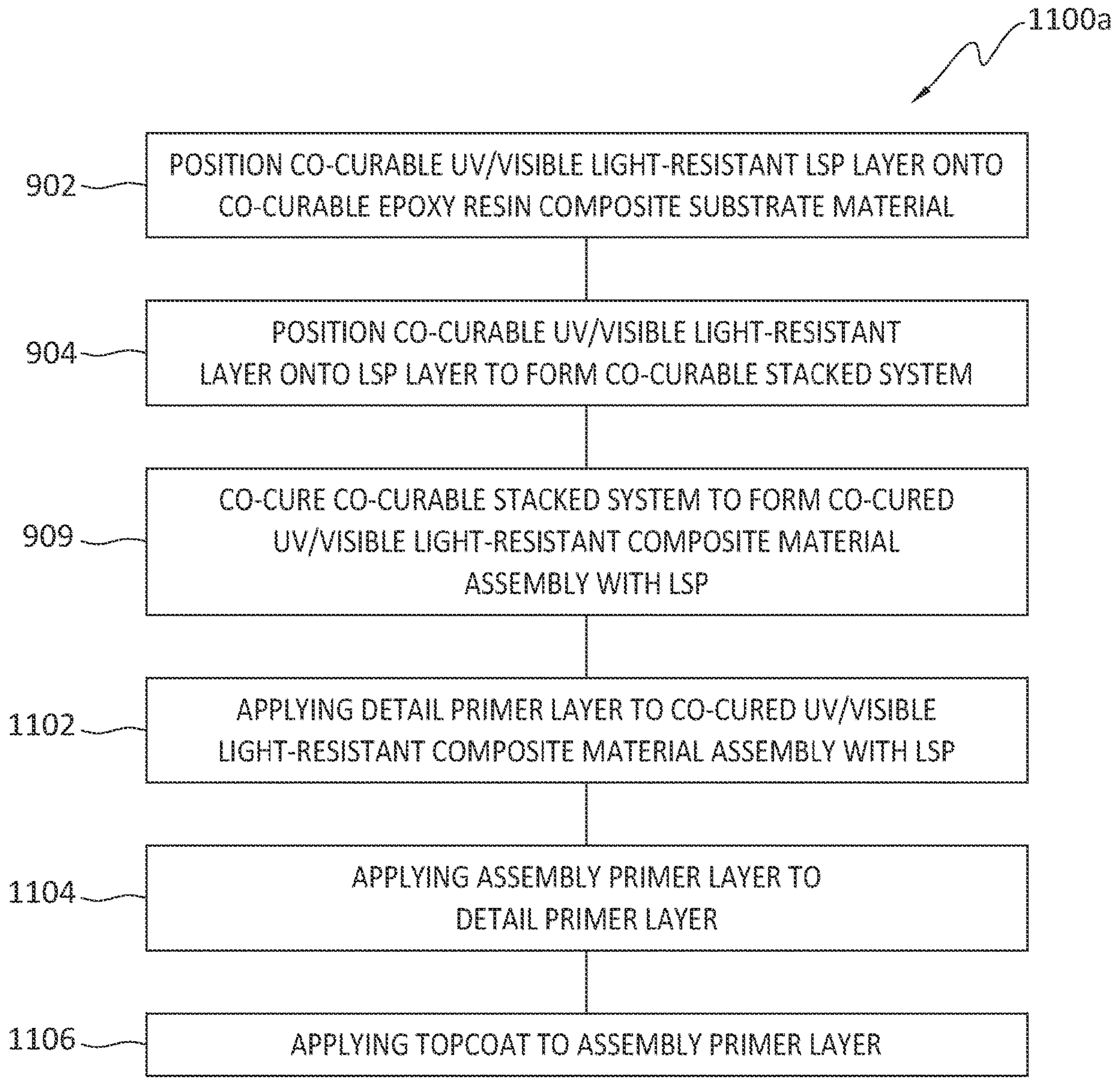
Figure 11B:
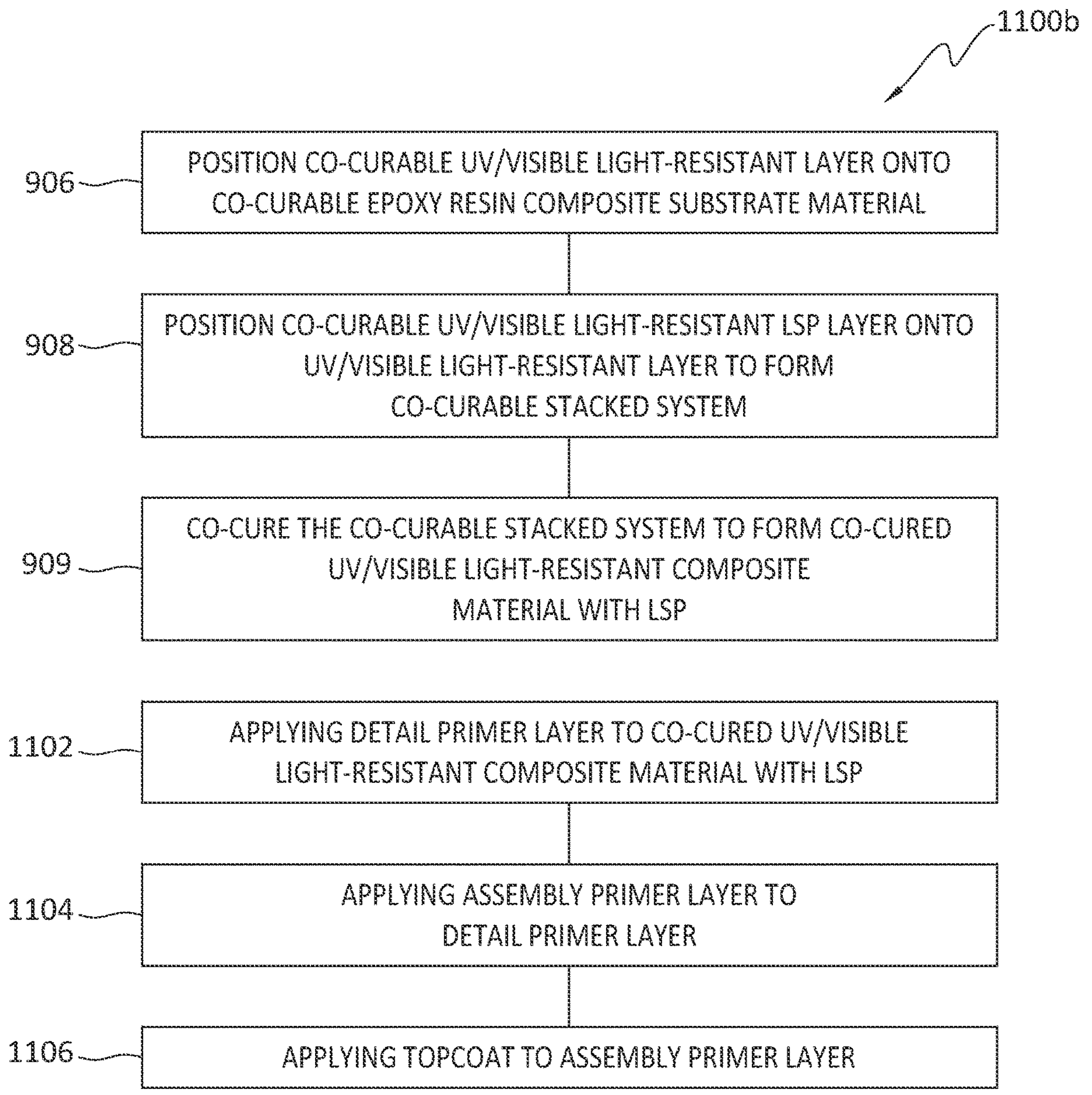
Figure 12A:
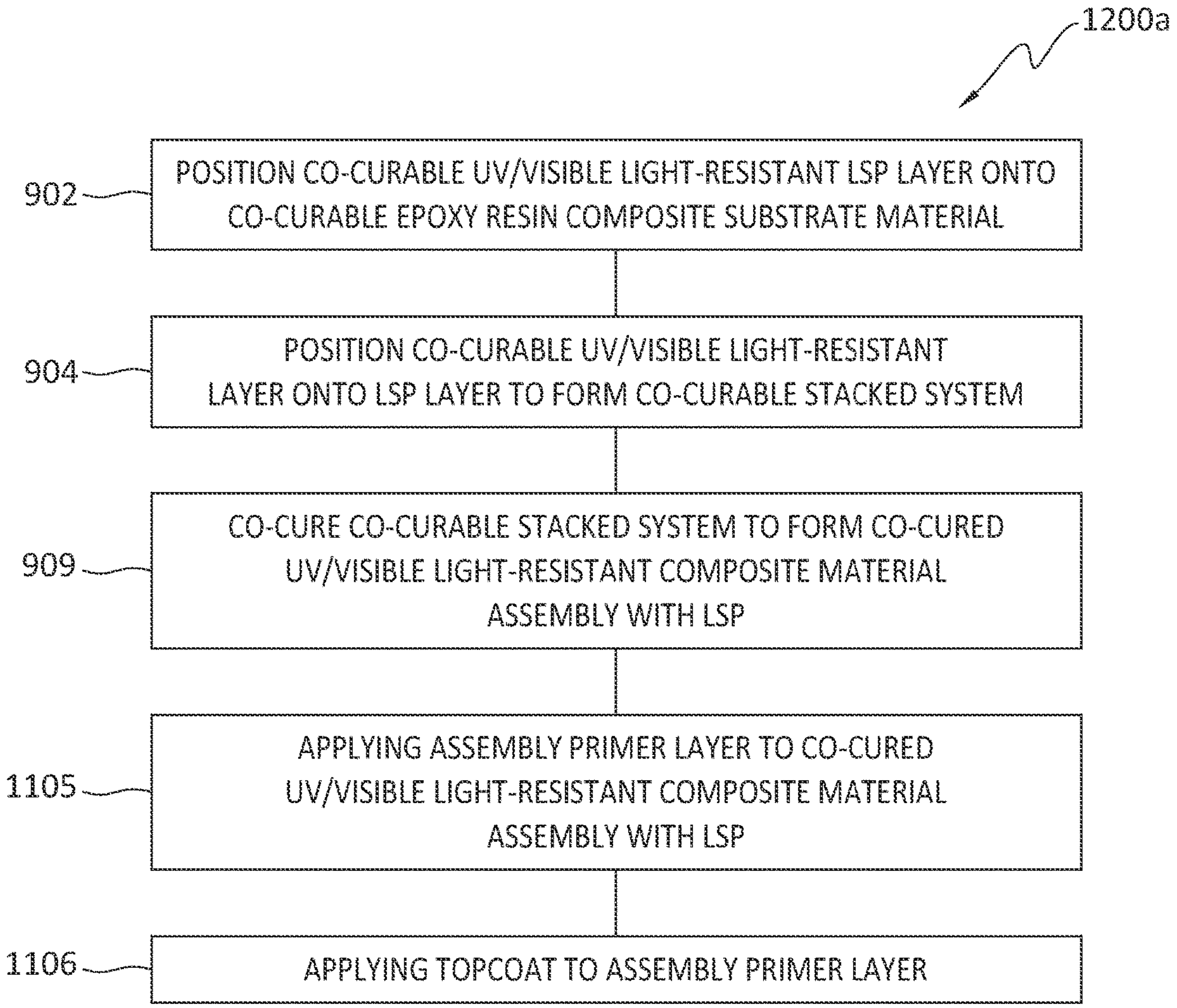
Figure 12B:
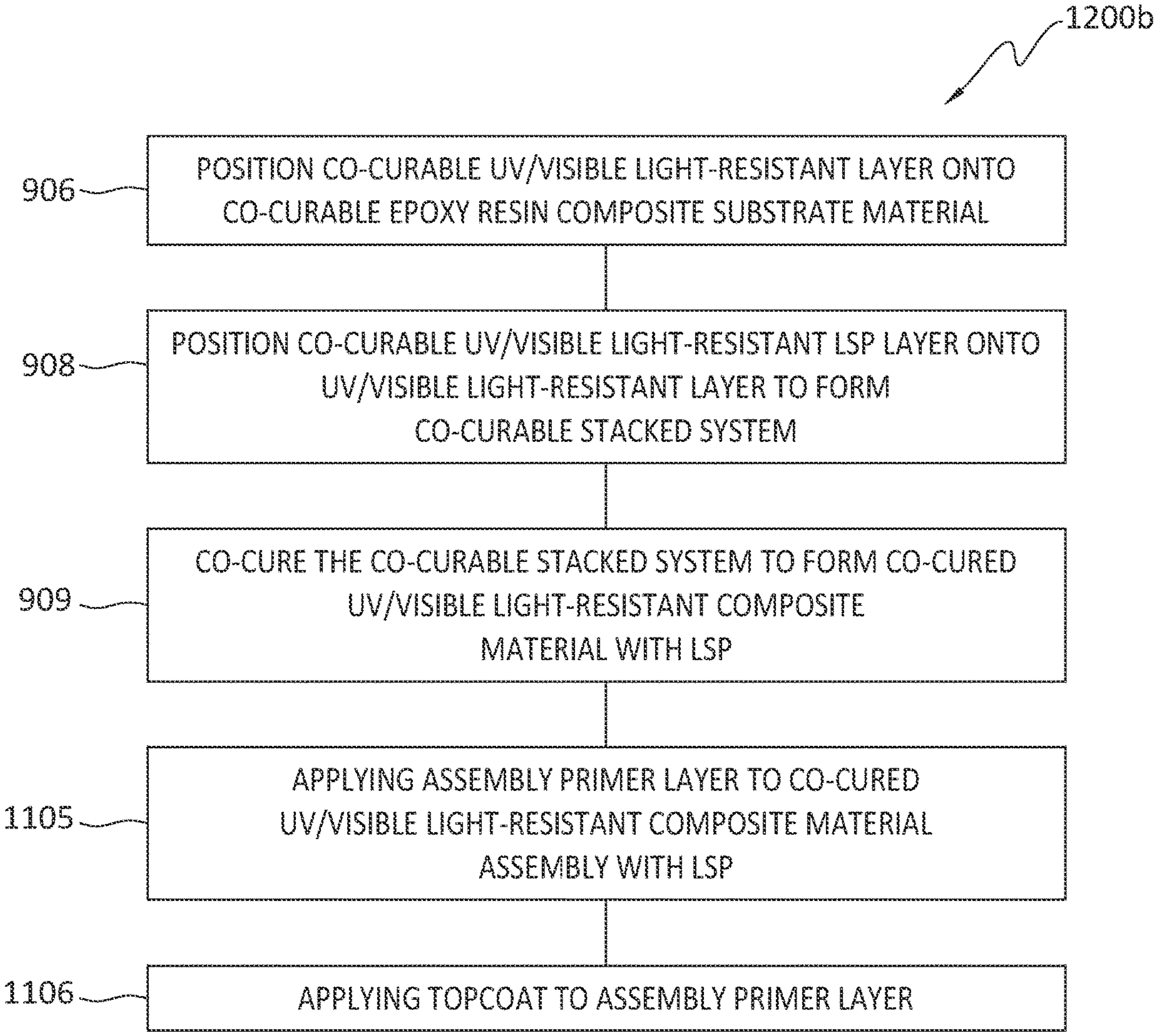
Figure 13:
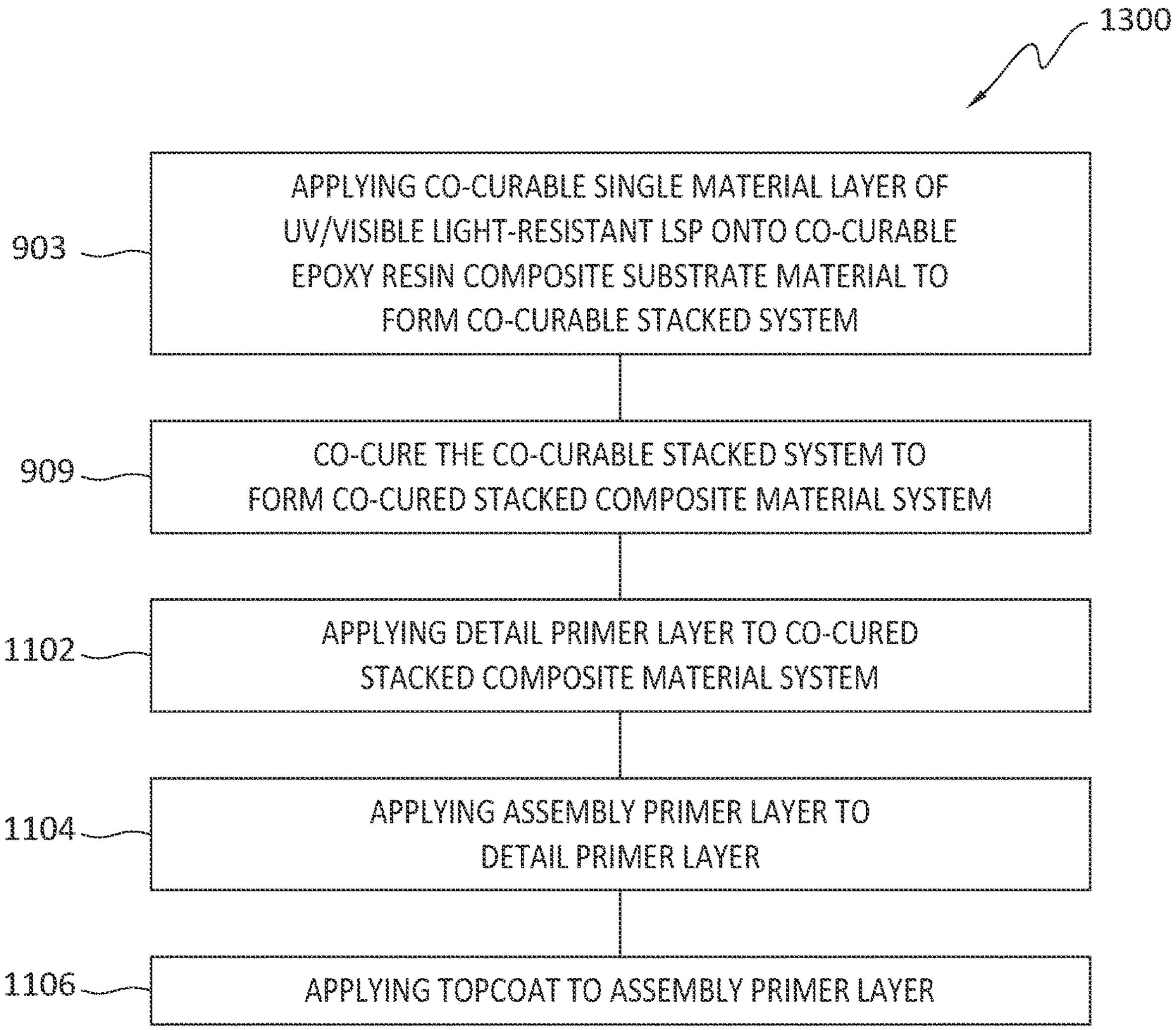
Figure 14:
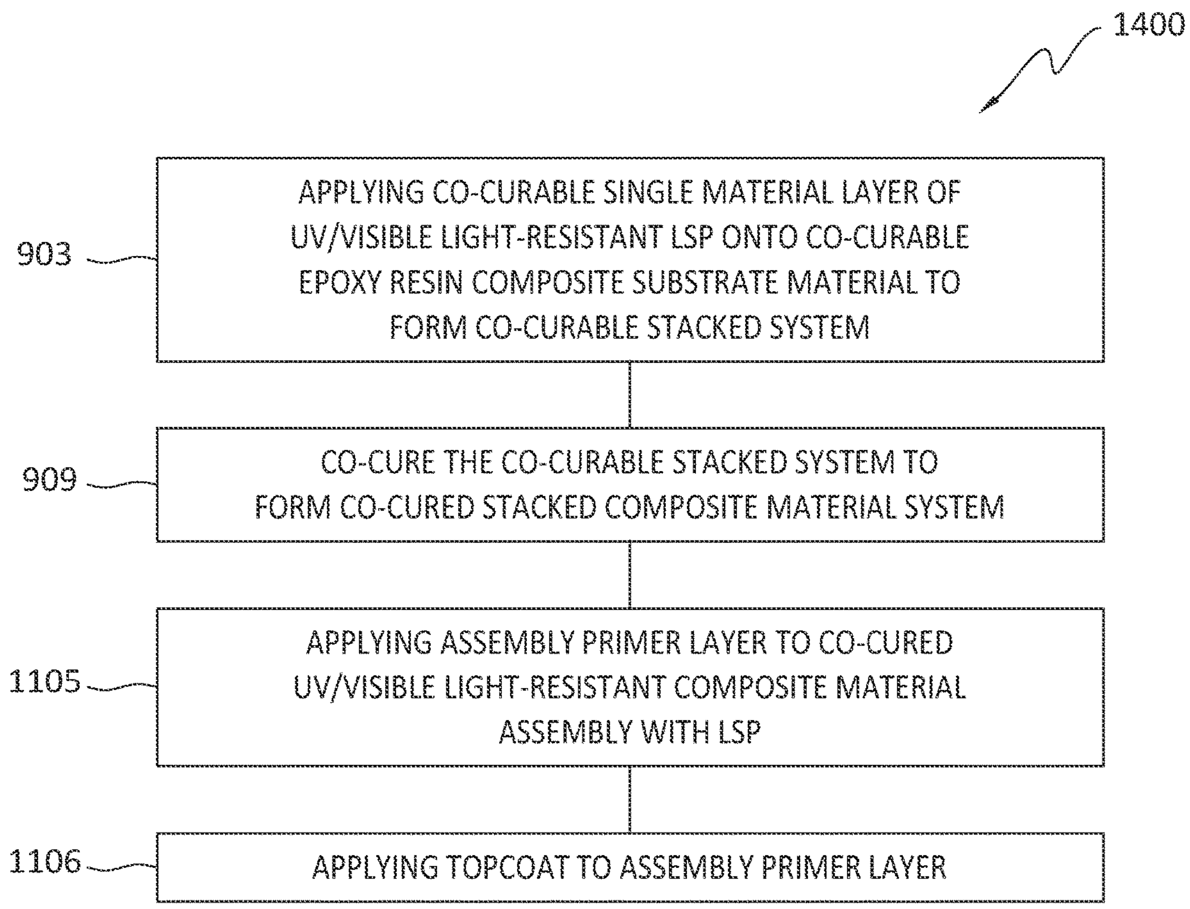

Having thus described variations of the disclosure in general terms, reference will now be made to the accompanying drawings, which are not necessarily drawn to scale, and wherein:

FIG. 1 is an illustration of a vehicle in the form of an aircraft, according to present aspects;

FIG. 2A is an enlarged cross-sectional side view of UV/visible light-resistant co-curable composite material structures, according to present aspects;

FIG. 2B is an enlarged cross-sectional side view of UV/visible light-resistant co-cured composite material structures, according to present aspects;

FIG. 3A is an enlarged cross-sectional side view of UV/visible light-resistant co-curable composite material structures, according to present aspects;

FIG. 3B is an enlarged cross-sectional side view of UV/visible light-resistant co-cured composite material structures, according to present aspects;

FIG. 4A is an enlarged cross-sectional side view of UV/visible light-resistant co-cured composite material structures, according to present aspects;

FIG. 4B is an enlarged cross-sectional side view of UV/visible light-resistant co-cured composite material structures, according to present aspects;

FIG. 5A is an enlarged cross-sectional side view of UV/visible light-resistant co-cured composite material structures, according to present aspects;

FIG. 5B is an enlarged cross-sectional side view of UV/visible light-resistant co-cured composite material structures, according to present aspects;

FIG. 6A is an enlarged cross-sectional side view of UV/visible light-resistant co-curable composite material structures, according to present aspects;

FIG. 6B is an enlarged cross-sectional side view of UV/visible light-resistant co-cured composite material structures, according to present aspects;

FIG. 7 is an enlarged cross-sectional side view of UV/visible light-resistant co-cured composite material structures, according to present aspects;

FIG. 8 is an enlarged cross-sectional side view of UV/visible light-resistant co-cured composite material structures, according to present aspects;

FIG. 9A is a flowchart outlining a method, according to present aspects;

FIG. 9B is a flowchart outlining a method, according to present aspects;

FIG. 10A is a flowchart outlining a method, according to present aspects;

FIG. 10B is a flowchart outlining a method, according to present aspects;

FIG. 11A is a flowchart outlining a method, according to present aspects;

FIG. 11B is a flowchart outlining a method, according to present aspects;

FIG. 12A is a flowchart outlining a method, according to present aspects;

FIG. 12B is a flowchart outlining a method, according to present aspects;

FIG. 13 is a flowchart outlining a method, according to present aspects; and FIG. 14 is a flowchart outlining a method, according to present aspects.

DETAILED DESCRIPTION

According to present aspects, co-curable material layers can be applied to and co-cured with composite material substrate surfaces as, for example, coatings, applied layers, applied film layers, etc., for purposes that can include changing the characteristics of the composite material assembly. In addition, primers or other coating layers can be added to a composite material to improve adhesion of subsequent coating layers such as, for example, paints, topcoats, etc., to a composite material surface that may already have one or more other co-curable layers applied to a co-curable composite material substrate.

The previously-conducted layering of coating materials onto composite material surfaces is labor intensive, time-consuming and can add substantial weight to large objects and large structures that include such composite materials having multiple coating layers. In addition, paint removal processes that remove various paint coating layers from composite materials can often damage protective surfacing layers that can be applied to composite materials and that are applied beneath paint coating layers and that can require significant resurfacing once the paint layers are stripped from the surfacing layers. For example, one or more of the composite material coating layers can each require separate surfacing preparation steps and procedures prior to the subsequent deposition of one or more coating layers onto composite material surfaces. In some instances, a portion of one or more previously deposited coating(s) must be removed, or otherwise reworked, before adding further coating layers. Such intermediate reworking of composite material surfaces during the treatment of composite material surfaces is also labor-intensive, time-consuming, and costly.

During the fabrication of composite material parts that can include for example, an epoxy resin-based composite material that can comprise, for example, a carbon fiber reinforced polymer material, etc., composite material surfaces can begin to degrade, even during production, at the composite material surface due to exposure to ambient ultraviolet/visible light (UV/visible light) radiation. To avoid a change in surface characteristic of a composite material that can be caused, at least in part, by composite material exposure to UV/visible light radiation, composite material surfaces are often protected with polymeric coverings or coated with at least one protective layer such as, for example, a spray applied surfacer, a primer layer, etc., with the protective layer containing, for example, a UV "blocking" agent.

Composite materials are typically post-processed or "reworked", for example, to re-paint and/or resurface composite materials. For example, primers and paint coatings that include a UV mitigation, or a UV "blocking" agent can be applied to a composite material surface for the purpose of protecting a composite material surface from degradation and/or discoloration that can be caused, for example, by exposing the composite material to ultraviolet/visible light (UV/visible light) radiation during the use of the composite material as a construction material in the manufacture of, for example, a larger structure.

Applying UV mitigation, or "blocking", agents in layers to composite surfaces often adds manufacturing complexity in the form of, at least, increasing manufacturing time, increasing rework time, increasing overall production cost, etc., as such applied UV blocking material coverings typically are removed from the composite material or reactivated chemically or mechanically before additional composite material assembly processing is conducted. In addition, primer and surfacing film layers are often treated to accommodate a subsequent paint layer or topcoat. This treatment of individual subsequent layers added to a composite material system (that can be layers arranged into a "stack" on the composite material substrate (also referred to equivalently herein as a "stacked system", an "assembly system", or a "system".) again leads to increased manufacturing time, increased rework time, increased overall production cost, etc.

In addition, UV/visible light damage from UV/visible light wavelengths impacting coating layers used to coat composite materials, and/or impacting underlying composite materials during aircraft manufacture and aircraft use, can cause a composite material to require material rework. Exposure to UV/visible light radiation can alter a material's characteristic over time (e.g., during the serviceable life of a component, etc.). For example, UV/visible light radiation can render a coating layer or composite material vulnerable to processing damage, such as, for example, when a layer or composite material is exposed to, for example, a mechanical paint removal technique. Material layer selection for large structures to guard against environmental damage, including UV/visible light damage, can result in a required application of a series of coating layers, with each such coating layer application resulting in a significant amount of time, expense, and resulting added weight to large structures including, for example, aircraft (where weight considerations can further impact fuel usage, cargo and passenger capacity, aircraft range, etc.).

Further, some coatings (e.g. paints and primers, etc.) are often electrically insulative (e.g., comprising a dielectric material) and can impede the dissipation of static and other electrical charges. However, certain structures require the need to dissipate electrical charges that build up on a structure's interior and/or exterior surfaces, including static electrical charges, and charges resulting from, for example lightning strikes, etc. The need for electrical charge dissipation is increasingly important in the aircraft industry, as aircraft manufacture continues to incorporate non-metallic materials. Further, in certain aircraft assemblies, non-metallic materials, such as composites, plastics, etc., that do not readily dissipate electrical charges predictably across their surfaces may be joined with, or otherwise contact, assemblies and sub-assemblies that comprise metallic materials that do conduct, and otherwise predictably direct, electrical charges. That is, components, assemblies and sub-assemblies that include both composite and metallic materials may be used in the manufacture of, or otherwise incorporated into, larger structures (e.g. aircraft).

Such structures may encounter electromagnetic effects (EMEs) including, for example, and without limitation, lightning strikes. When a structure encounters an EME, the electrical charge delivered to the structure travels throughout any conductive path. Accordingly, if a structure comprising insulative (e.g., dielectric) materials does not present a conductive pathway for encountered EMEs, the current from the EMEs can significantly damage the insulative materials that can be, for example, composite materials.

Present aspects are disclosed that are directed to co-curable and co-cured composite material assemblies comprising a co-curable and co-cured UV/visible light-resistant lightning strike protection layer that is co-cured with the co-curable composite material substrate to form a co-cured UV/visible light-resistant lightning strike protection composite material assembly. The incorporation into the co-cured composite material substrate of the co-cured UV/visible light-resistant lightning strike protection layer significantly impacts composite material manufacturing processes, improves the performance of the co-cured composite material assembly (and larger structures comprising the co-cured composite material assembly), and reduces the weight of the composite material assembly by, at least, obviating the need to include separate UV-resistant coatings formerly applied to composite material substrates (in the formation of composite material assemblies, such as, e.g., for the protection of composite materials from UV/visible light damage both during composite material manufacture and during use of the composite material assembly, and in the preparation of a composite material system used in structural assemblies for larger components, including internal and exterior surfaces of vehicles, including, for example, aircraft. The terms co-cured UV/visible light-resistant composite material "system" and co-cured UV/visible light-resistant composite material "assembly" are used equivalently herein.

According to present aspects, methods for improving the UV/visible light protection and reducing UV/visible light degradation of composite material substrate surface are disclosed, as well as composite material substrates having improved UV/visible light protection without the previously required presence of typically applied protective coverings or layers of primers or separate layers of, for example, UV-absorbing paint. In addition to preventing UV/visible light degradation of underlying composite material substrate surfaces, presently disclosed methods, present systems, and present apparatuses eliminate the need for protective coverings, protective primer layers, UV-absorbing paint layers, with the result being a reduction in a composite material system complexity and overall composite material system weight that further reduces composite material processing time. The reduction in composite material UV/visible light degradation further decreases the occurrence of the need for composite material rework (such as scheduled and unscheduled rework previously necessitated by such UV/visible light degradation).

According to present aspects, a co-curable composite material substrate is provided that can comprise an epoxy resin-based composite material in combination with a fiber matrix that can include carbon fibers, boron, fiber, aramid fibers, fiberglass fibers, polyester fibers, and combinations thereof, with carbon fibers being particularly preferred, and with a carbon fiber reinforced polymer being particularly preferred as the composite material substrate.

According to further presently disclosed aspects, a co-curable composite material for use in the manufacture of a composite material structure further includes a co-curable UV/visible light-resistant lightning strike protection layer (equivalently referred to herein as a co-curable UV/visible light-inhibiting lightning strike protection layer), with the co-curable UV/visible light-resistant lightning strike protection layer in the form of a layer that can include a conductive material in combination with a non-conductive material. The conductive material can be a metallic material that can be in the form of, and otherwise include, for example, expanded, knitted, solid, and/or woven metallic material of the type that can be used in lightning strike protection layers incorporated into large structures including, for example, aircraft.

According to present aspects, the conductive material can be combined with a co-curable UV/visible light-resistant material to form the co-curable UV/visible light-resistant lightning strike protection material layer that can be applied in a layer that can be applied as an individual layer ply, or that can be applied in a plurality of plies. Further, the co-curable UV/visible light-resistant lightning strike protection material layer can be applied as a film. The co-curable UV/visible light-resistant lightning strike protection material layer can comprise a fiber-containing material or other material in a resin matrix such as, for example, fiberglass, carbon fibers, polyester fibers, aramid fibers, and combinations thereof. In a further aspect, the co-curable UV/visible light-resistant lightning strike protection material layer can comprise a quartz-containing material in a resin matrix.

According to present aspects, the co-curable UV/visible light-resistant lightning strike protection material layer is disposed within the composite material assembly such that the co-curable UV/visible light-resistant lightning strike protection material layer is in intimate contact with the co-curable composite material substrate. In other aspects, the co-curable UV/visible light-resistant lightning strike protection material layer is disposed within the composite material assembly, such that the co-curable UV/visible light-resistant lightning strike protection material layer is disposed onto a second co-curable UV/visible light-resistant material layer, such that the that second co-curable UV/visible light-resistant material layer is positioned in the composite material assembly between the co-curable composite material substrate and the co-curable UV/visible light-resistant lightning strike protection material layer. Further, the second co-curable UV/visible light-resistant layer also can be applied as a film. The second co-curable UV/visible light-resistant layer can comprise a fiber-containing material or other material in a resin matrix such as, for example, fiberglass, carbon fibers, polyester fibers, aramid fibers, and combinations thereof. In a further aspect, the second co-curable UV/visible light-resistant layer can comprise a quartz-containing material in a resin matrix.

The co-curable composite material substrate, also referred to equivalently herein as the "co-curable substrate base layer", or the "co-curable underlayer", or the "co-curable "composite material substrate layer", can be a co-curable composite material that can be an epoxy resin-based material, including fiber reinforced polymer composite materials that can have an epoxy resin-based matrix, and that can include carbon fibers, boron fibers, aramid fibers, fiberglass fibers, polyester fibers, and combinations thereof, with carbon fibers being particularly preferred, and with a carbon fiber reinforced polymer being particularly preferred as the co-curable composite material substrate.

In further present aspects, the co-curable composite material substrate can be any suitable composite material that can be co-cured with the co-curable UV/visible light-resistant lightning strike protection layer and, if present, the second co-curable UV/visible light-resistant material layer, at a temperature or temperatures ranging from about 250° F. to about 370° F.

In another present aspect, co-curable UV/visible light-resistant lightning strike protection layer and, if present, the second co-curable UV/visible light-resistant material layer, are configured to be co-cured in a co-curing regimen, with the co-curing regimen comprising a co-curing temperature ranging from about 250° F. to about 370° F., and wherein one or more of the the co-cured UV/visible light-resistant lightning strike protection layer and the second co-cured UV/visible light-resistant layer have a UV/visible light transmittance value ranging from about 0% to about 20% UV transmittance for UV/visible light wavelengths ranging from about 200 nm to about 800 nm when the co-cured UV/visible light-resistant fiberglass-containing layer comprises an average thickness ranging from about 2 mils to about 6 mils.

Composite materials are often layered into laminates that have a selected number of composite material layers, often called "prepregs". Prepregs can be "pre-impregnated" composite fibers where a matrix material, such as an epoxy resin-based material, is already present. The fibers often take the form of a weave and the matrix is used to bond them together and to other components during manufacture. The composite matrix material is typically partially cured to allow easy handling. Such composite matrix material may require cool or cold storage to prevent further partial curing, or complete curing, and such composite matrix material is referred to as B-Stage material. Consequently, B-Stage prepregs are stored in cooled areas, as ambient heat can accelerate complete polymerization. Prepregs also allow one to impregnate a bulk amount of fiber and then store the prepreg in a cooled area for an extended time until a later cure. Prepregs are typically formed on a flat workable surface. Stacks of prepreg plies are then formed onto and, if desired, can be shaped into a desired shape using shaping or forming tools, also called mandrels. Present aspects contemplate, but are not limited to, the use of laid up layers of composite material prepregs to form the co-curable and co-cured composite material substrate.

According to present aspects, a "co-curable" material is defined as a material that can be co-cured with another material such that the two co-curable materials will co-cure when exposed to common curing conditions, such as those that can be imposed by a predetermined curing regimen (predetermined temperature, pressure, ramp up temperatures/rates, dwell periods, etc.) to form a "co-cured" composition and/or a co-cured material assembly.

According to present aspects, a selected degree of UV/visible light-resistance and UV/visible light-protection can be exclusively imparted to the composite material substrate by immediately contacting a co-curable composite material surface with a co-curable UV/visible light-resistant lightning strike protection layer and/or the second UV/visible light-resistant layer (that can be, for example, a fiberglass-containing layer) that, after co-curing, forms a co-cured UV/visible light-resistant composite material assembly. That is, according to present aspects, previously required UV/visible light-resistant primers, UV-blocking paints, etc., that were previously required can be eliminated, and/or their presence is otherwise obviated and/or significantly reduced in amount applied, as the UV/visible light protection function within a UV/visible light-resistant composite material can be exclusively satisfied by the addition and placement of the presently disclosed co-curable UV/visible light-resistant lightning strike protection layer (referred to equivalently herein as the "co-curable LSP layer"), alone or in combination with the second co-curable UV/visible light-resistant layer, with the co-curable LSP layer either provided in immediate contact with the co-curable composite material substrate, or with the co-curable LSP layer placed over the second co-curable UV/visible light-resistant layer when the second co-curable UV/visible light-resistant layer is placed in immediate contact with the co-curable composite material substrate.

By co-curing the co-curable UV/visible light-resistant lightning strike protection layer with the co-curable composite material substrate, advantages are imparted by the presently disclosed co-cured UV/visible light-resistant lightning-strike protection layer at least to the underlying epoxy-based co-cured composite material substrate and the entire co-cured composite material assembly as well as to the any material and/or structure that incorporates the co-cured composite material substrate and co-cured composite material assembly. According to present aspects, such imparted advantages include, without limitation, the UV/visible light protection of the epoxy-based composite material, as well as, for example, protection of a composite material substrate from deleterious effects of mechanical paint removal techniques, etc.

In addition, the robustness of the presently disclosed co-curable UV/visible light-resistant lightning strike protection layer that is co-cured onto and/or co-cured with, for example, a co-curable epoxy-based composite material substrate can endure subsequent and repeated heat treatments that may be required during subsequent and repeated repainting protocols. That is, unlike some currently required repainting protocols, the presently described co-cured UV/visible light-resistant lightning strike protection layer need not be replaced, removed, or otherwise reapplied during reworking, paint removal, repainting, repeated heat treatments, etc. Present aspects contemplate if required, only the removal, reconditioning, reworking, etc., of only the layers coated atop the presently disclosed co-cured composite material assembly such as, for example, topcoat layers, basecoat layers, clearcoat layers, intermediate coating layers, etc.

Through the use of the presently disclosed co-cured composite material assembly incorporating the co-curable UV/visible light-resistant lightning strike protection layer to form a co-cured UV/visible light-resistant lightning strike protection layer, a significant number of procedural steps that are otherwise, and have previously been, required during re-painting or reworking a composite material substrate are obviated; resulting in a substantial reduction in resources including, for example, material cost for replacing UV/visible light-damaged layers, manpower hours previously required for individual layer application treatment (e.g., individual layer pre-treatment surfacing steps, layer application steps, layer post-treatment surfacing steps, including chemical application, physical surfacing treatments such as, including sanding, etc., inspection of deposited layers, etc.).

FIG. 1 is an illustration of a vehicle in the form of an aircraft, according to present aspects. As shown in FIG. 1, aircraft 10 includes fuselage 11, wing assemblies 12, horizontal stabilizer assemblies 14, and vertical stabilizer assembly 16 with the presently disclosed co-cured composite material assemblies configured to form various aircraft assemblies including, for example, those shown in FIG. 1.

FIG. 2A is an enlarged cross-sectional representative side view of a co-curable UV/visible light-resistant co-curable composite material assembly 20*a* of a type that can be used as a structural assembly for an aircraft, including, for example, for an aircraft outer surface, with the co-curable UV/visible light-resistant composite material assembly 20*a* comprising a co-curable UV/visible light-resistant lightning strike protective layer 23*a* disposed and other wise positioned immediately adjacent to the co-curable composite material substrate 22*a*, according to present aspects.

As further shown in FIG. 2A, the co-curable composite material assembly 20*a* further comprises a second co-curable UV/visible light-resistant layer 24*a*. As shown in FIG. 2A, the co-curable composite material substrate 22*a* has a co-curable composite material substrate first side 22*a*', and a co-curable composite material substrate second side 22*a*". The co-curable UV/visible light-resistant lightning strike protective layer 23*a* has a co-curable UV/visible light-resistant lightning strike protective layer first side 23*a*' and a co-curable UV/visible light-resistant lightning strike protective layer second side 23*a*". In addition, the second co-curable UV/visible light-resistant layer 24*a* has a second co-curable UV/visible light-resistant layer first side 24*a*' and a second co-curable UV/visible light-resistant layer second side 24*a*". As shown in FIG. 2A, the co-curable UV/visible light-resistant lightning strike protection layer 23*a* is positioned between the co-curable composite material substrate 22*a* and the second co-curable UV/visible light-resistant layer 24*a*.

FIG. 2B is an enlarged cross-sectional representative side view of a co-cured UV/visible light-resistant composite material assembly 20*b* of a type that can be used as a structural assembly for an aircraft, including for an aircraft outer surface, (and that is shown in FIG. 2A in the uncured state) with the co-cured UV/visible light-resistant composite material 22*b* comprising a co-cured UV/visible light-resistant lightning strike protective layer 23*b* disposed or otherwise positioned immediately adjacent to the composite material substrate 22*b*, according to present aspects.

As further shown in FIG. 2B, the co-cured composite material assembly 20*b* further comprises a second co-cured UV/visible light-resistant layer 24*b*. As shown in FIG. 2B, the co-cured composite material substrate 22*b* has a co-cured composite material substrate first side 22*b*', and a co-cured composite material substrate second side 22*b*". The co-cured UV/visible light-resistant lightning strike protective layer 23*b* has a co-cured UV/visible light-resistant lightning strike protective layer first side 23*b*' and a co-cured UV/visible light-resistant lightning strike protective layer second side 23*b*". In addition, the second co-cured UV/visible light-resistant layer 24*b* has a second co-cured UV/visible light-resistant layer first side 24*b*' and a second co-cured UV/visible light-resistant layer second side 24*b*". As shown in FIG. 2B, the co-cured UV/visible light-resistant lightning strike protection layer 23*b* is positioned between the co-curable composite material substrate 22*b* and the second co-curable UV/visible light-resistant layer 24*b*.

FIG. 3A is an enlarged cross-sectional representative side view of a co-curable UV/visible light-resistant co-curable composite material assembly 30*a* of a type that can be used, for example, as a structural assembly for an aircraft, including for an aircraft outer surface, with the co-curable UV/visible light-resistant composite material assembly 30*a* comprising a co-curable UV/visible light-resistant lightning strike protective layer 23*a*, and a second UV/visible light-resistant layer 24*a*, with the second UV/visible light-resistant layer 24*a* disposed or otherwise positioned immediately adjacent to a co-curable composite material substrate 22*a*, according to present aspects.

As shown in FIG. 3A, the co-curable composite material substrate 22*a*, the co-curable UV/visible light-resistant lightning strike protection layer 23*a*, and the second co-curable UV/visible light-resistant layer 24*a* each have first and second sides as shown and as enumerated in FIG. 2A. While both FIGS. 2A and 3A depict co-curable composite material assemblies (20*a*, 30*a*, respectively, and, e.g., assemblies that are configured to be co-cured together in a co-curing regimen), a difference between co-curable composite material assemblies 20*a*, 30*a* is the placement of the co-curable UV/visible light-resistant lightning strike protection layer 23*a*. As shown in FIG. 2A, in the co-curable composite material assembly 20*a* the co-curable UV/visible light-resistant lightning strike protection layer 23*a* is positioned immediately adjacent to the co-curable composite material substrate 22*a*; whereas, as shown in FIG. 3A, in the co-curable composite material assembly 30*a*, it is the second co-curable UV/visible light-resistant layer 24*a* that is positioned immediately adjacent to the co-curable composite material substrate 22*a*.

FIG. 3B is an enlarged cross-sectional representative side view of a co-cured UV/visible light-resistant composite material assembly 30*b* of a type that can be used, for example, as a structural assembly for an aircraft, including for an aircraft outer surface, and that is shown in FIG. 3A in the uncured state, with the co-cured UV/visible light-resistant composite material assembly 30*b* comprising a co-cured UV/visible light-resistant lightning strike protection layer 23*b*, and a co-cured second UV/visible light-resistant layer 24*b*, with the second UV/visible light-resistant layer 24*b* disposed or other positioned immediately adjacent to the co-cured composite material substrate 22*a*, according to present aspects.

As shown in FIG. 3B, the co-cured composite material substrate 22*b*, the co-cured UV/visible light-resistant lightning strike protection layer 23*b*, and the second co-cured UV/visible light-resistant layer 24*b* each have first and second sides as shown and as enumerated in FIG. 2B. While both FIGS. 2B and 3B depict co-cured composite material assemblies (20*b*, respectively), a difference between co-cured composite material assemblies 20*b*, 30*b* is the placement of the co-cured UV/visible light-resistant lightning strike protection layer 23*b* within the co-cured composite material assembly. As shown in FIG. 2B, in the co-cured composite material assembly 20*b*, the co-cured UV/visible light-resistant lightning strike protection layer 23*b* is positioned immediately adjacent to the co-cured composite material substrate 22*b*; whereas, as shown in FIG. 3B, in the co-cured composite material assembly 30*b*, it is the second co-cured UV/visible light-resistant layer 24*b* that is positioned immediately adjacent to the co-cured composite material substrate 22*b*.

Both of the co-cured UV/visible light-resistant lightning strike protection layer and the second co-cured UV/visible light-resistant layer, after co-curing, can be configured to receive additional coating layers that can include, for example, a detail primer layer, an assembly primer layer, etc., with the additional coating layers configured to receive a topcoat, including, for example a final topcoat. FIGS. 4A, 4B, 5A, 5B, 7, and 8 are enlarged representative cross-sectional side views of co-cured composite material assemblies, according to present aspects, that show the addition of a primer assembly coating layer and/or a detail primer layer incorporated into composite material assemblies, according to present aspect.

According to present aspects, the co-cured composite material assemblies facilitate the passage through the composite material assemblies and systems of electrical current (e.g., from a lightning strike, etc.) with the electrical current following the presented conductive pathway within the structure that has been impacted, for example, by a lightning strike or other EME. Accordingly, present aspects contemplate orienting the co-cured UV/visible light-resistant protection layer within a co-cured composite material assembly at a position away from the co-cured composite material substrate itself (that could be damaged from an impacting lightning strike, for example).

FIGS. 4A and 4B are enlarged cross-sectional representative side views of a UV/visible light-resistant cured composite material system with a reduced amount of detail primer layer and without the presence of further additional UV/visible light-resistant paint layers required; two of the many advantages made by the presently disclosed co-cured UV/visible light-resistant composite material assemblies, and according to present aspects. In FIG. 4A, the co-cured UV/visible light-resistant lightning strike protection layer is shown disposed or otherwise positioned immediately adjacent to the co-cured composite material substrate in the composite material assembly, according to present aspects. In FIG. 4B, the co-cured second UV/visible light-resistant layer is shown disposed or otherwise positioned immediately adjacent to the co-cured composite material substrate in the composite material assembly, according to present aspects.

More specifically, FIG. 4A shows a composite material system 40*a* comprising a layered system further comprising the co-cured composite material assembly 20*b* (as also shown in FIG. 2B) with the co-cured composite material assembly 20*b* comprising the co-cured composite material substrate 22*b* having a co-cured composite material substrate first side 22*b*', and a co-cured composite material substrate second side 22*b*". The co-cured UV/visible light-resistant lightning strike protective layer 23*b* is positioned immediately adjacent the co-cured composite material assembly substrate 22*b*, with the co-cured UV/visible light-resistant lightning strike protective layer 23*b* having a co-cured UV/visible light-resistant lightning strike protective layer first side 23*b*' and a co-cured UV/visible light-resistant lightning strike protective layer second side 23*b*". In addition, the second co-cured UV/visible light-resistant layer 24*b*, having a second co-cured UV/visible light-resistant layer first side 24*b*' and a second co-cured UV/visible light-resistant layer second side 24*b*" is shown positioned immediately adjacent to the co-cured UV/visible light-resistant lightning strike protective layer 23*b*. As further shown in FIG. 4A, the co-cured UV/visible light-resistant lightning strike protection layer 23*b* is positioned between the co-curable composite material substrate 22*b* and the second co-curable UV/visible light-resistant layer 24*b*. FIG.

4A further shows the co-cured composite material assembly 20*b* coated with layers that can be finishing layers including a detail primer layer 32 in contact with and covering the co-cured second UV/visible light-resistant layer, an assembly primer layer 34 in contact with and covering the detail primer layer 32, and a topcoat layer 36 in contact with and covering the assembly primer layer 34.

FIG. 4B shows a composite material system 40*b* comprising a layered system further comprising the co-cured composite material assembly 30*b* (as also shown in FIG. 3B) with the co-cured composite material assembly 30*b* comprising the co-cured composite material substrate 22*b* (having a co-cured composite material substrate first side 22*b*', and a co-cured composite material substrate second side 22*b*"). The co-cured second UV/visible light-resistant layer 24*b* is positioned immediately adjacent the co-cured composite material assembly substrate 22*b*, with the co-cured second UV/visible light-resistant layer 24*b* having a co-cured second UV/visible light-resistant layer first side 24*b*' and a co-cured second UV/visible light-resistant second side 24*b*". In addition, the co-cured UV/visible light-resistant lightning strike protection layer 23*b*, (having a co-cured UV/visible light-resistant lightning strike protection layer first side 23*b*' and a co-cured UV/visible light-resistant lightning strike protection layer second side 23*b*") is shown positioned immediately adjacent to the co-cured second UV/visible light-resistant layer 24*b*. As further shown in FIG. 4B, the co-cured second UV/visible light-resistant layer 24*b* is positioned between (and immediately adjacent to) the co-curable composite material substrate 22*b* and the co-curable UV/visible light-resistant lightning strike protection layer 23*b*. FIG. 4B further shows the co-cured composite material assembly 20*b* coated with layers that can be finishing layers including a detail primer layer 32 in contact with and covering the co-cured UV/visible light-resistant lightning strike protection layer 23*b*, an assembly primer layer 34 in contact with and covering the detail primer layer 32, and a topcoat layer 36, that can be a final topcoat layer, in contact with and covering the assembly primer layer 34.

Further present aspects contemplate a composite material assembly that would not require a detail layer, further simplifying an overall composite structural material system, and potentially reducing the overall thickness and processing complexity of the presently disclosed composite material assemblies and systems as compared to composite material assemblies and systems currently in use. FIGS. 5A and 5B show the composite material assemblies similar to those shown in FIGS. 4A and 4B, but without the presence of a detail primer layer.

More specifically FIG. 5A shows a composite material system 50*a* comprising a layered system further comprising the co-cured composite material assembly 20*b* (as also shown in FIGS. 2B and 4A) with the co-cured composite material assembly 20*b* comprising the co-cured composite material substrate 22*b* having a co-cured composite material substrate first side 22*b*', and a co-cured composite material substrate second side 22*b*". The co-cured UV/visible light-resistant lightning strike protective layer 23*b* is positioned immediately adjacent the co-cured composite material assembly substrate 22*b*, with the co-cured UV/visible light-resistant lightning strike protective layer 23*b* having a co-cured UV/visible light-resistant lightning strike protective layer first side 23*b*' and a co-cured UV/visible light-resistant lightning strike protective layer second side 23*b*". In addition, the second co-cured UV/visible light-resistant layer 24*b*, (having a second co-cured UV/visible light-resistant layer first side 24*b*' and a second co-cured UV/visible light-resistant layer second side 24*b*") is shown positioned immediately adjacent to the co-cured UV/visible light-resistant lightning strike protective layer 23*b*.

As further shown in FIG. 5A, the co-cured UV/visible light-resistant lightning strike protection layer 23*b* is positioned between the co-curable composite material substrate 22*b* and the second co-curable UV/visible light-resistant layer 24*b*. FIG. 5A further shows the co-cured composite material assembly 20*b* coated with layers that can be finishing layers including an assembly primer layer 34 in contact with and covering the co-cured second UV/visible light-resistant layer 24*b*, and a topcoat layer 36 in contact with and covering the assembly primer layer 34.

FIG. 5B shows a composite material system 50*b* comprising a layered system further comprising the co-cured composite material assembly 30*b* (as also shown in FIGS. 3B and 4B) with the co-cured composite material assembly 30*b* comprising the co-cured composite material substrate 22*b* (having a co-cured composite material substrate first side 22*b*', and a co-cured composite material substrate second side 22*b*"). The co-cured second UV/visible light-resistant layer 24*b* is positioned immediately adjacent the co-cured composite material assembly substrate 22*b*, with the co-cured second UV/visible light-resistant layer 24*b* having a co-cured second UV/visible light-resistant layer first side 24*b*' and a co-cured second UV/visible light-resistant second side 24*b*". In addition, the co-cured UV/visible light-resistant lightning strike protection layer 23*b*, (having a co-cured UV/visible light-resistant lightning strike protection layer first side 23*b*' and a co-cured UV/visible light-resistant lightning strike protection layer second side 23*b*") is shown positioned immediately adjacent to the co-cured second UV/visible light-resistant layer 24*b*. As further shown in FIG. 5B, the co-cured second UV/visible light-resistant layer 24*b* is positioned between (and immediately adjacent to) the co-curable composite material substrate 22*b* and the co-curable UV/visible light-resistant lightning strike protection layer 23*b*. FIG. 5B further shows the co-cured composite material assembly 20*b* coated with layers that can be finishing layers including an assembly primer layer 34 in contact with and covering the co-cured UV/visible light-resistant lightning strike protection layer 23*b*, and a topcoat layer 36 in contact with and covering the assembly primer layer 34.

According to present aspects, as shown in FIGS. 2A and 3A, the two co-curable UV/visible light-resistant layers along with the co-curable composite material substrate (the three layers taken together), together comprise the co-curable composite material assembly. Similarly, according to present aspects, as shown in FIGS. 2B, 3B, 4A, 4B, 5A, and 5B, the two co-cured UV/visible light-resistant layers along with the co-cured composite material substrate (the three layers taken together), together comprise the co-cured composite material assembly. The inclusion of the UV/visible light-resistant lightning strike protection layer imparts conductive properties to the composite material assembly, with the composite material assemblies, according to present aspects comprising an electrical conductivity ranging from about $2\times10^7$ Siemens/meter to $6.4\times10^7$ Siemens/meter.

According to further present aspects, the presently disclosed co-curable and co-cured UV/visible light-resistant lightning strike protection layer and the co-curable and co-cured second UV/visible light-resistant layer may be combined into a single layer (that can be, for example, a single ply layer). FIG. 6A is an enlarged cross-sectional representative side view of a co-curable UV/visible light-resistant co-curable composite material assembly 60*a* of a type that can be used as a structural assembly, for example, for an aircraft, including, for example, an aircraft outer surface, with the co-curable UV/visible light-resistant composite material system 60*a* comprising a co-curable UV/visible light-resistant material layer 25*a* comprising a co-curable UV/visible light-resistant lightning strike protection material and (combined with) a further co-curable UV/visible light-resistant material that can be different or the same as the co-curable material component in the co-curable lightning strike protection material. As shown in FIG. 6A, the co-curable UV/visible light-resistant material layer 25*a* is disposed onto and is otherwise positioned immediately adjacent to co-curable composite material substrate 22*a*, according to present aspects. As shown in FIG. 6A, co-curable composite material substrate 22*a* has a co-curable composite material substrate first side 22*a*', and a co-curable composite material substrate second side 22*a*". The co-curable UV/visible light-resistant material layer 25*a* (comprising the co-curable UV/visible light-resistant lightning strike protection material) 25*a* has a co-curable UV/visible light-resistant material layer first side 25*a*' and a co-curable UV/visible light-resistant material layer second side 25*a*".

FIG. 6B is an enlarged cross-sectional representative side view of a co-cured UV/visible light-resistant co-cured composite material assembly 60*b* of a type that can be used as a structural assembly, for example, for an aircraft, including for an aircraft outer surface, with the co-cured UV/visible light-resistant composite material assembly 60*b* comprising a co-cured UV/visible light-resistant material layer 25*b* comprising a co-cured UV/visible light-resistant lightning strike protection material and (combined with) a further UV/visible light-resistant material that can be different or the same as material component in the co-cured lightning strike protection material. As shown in FIG. 6B, the co-cured UV/visible light-resistant material layer 25*b* is disposed onto and is otherwise positioned immediately adjacent to co-cured composite material substrate 22*b*, according to present aspects. As shown in FIG. 6B, co-cured composite material substrate 22*b* has a co-cured composite material substrate first side 22*b*', and a co-cured composite material substrate second side 22*b*". The co-cured UV/visible light-resistant material layer 25*b* (comprising the co-cured UV/visible light-resistant lightning strike protection material) has a co-curable UV/visible light-resistant material layer first side 25*b*' and a co-curable UV/visible light-resistant material layer second side 25*b*".

FIG. 7 is an enlarged cross-sectional side representative view of a composite material system 70 according to present aspects. As shown in FIG. 7, composite material system 70 comprises a layered system further comprising the co-cured composite material assembly 60*b* (as also shown in FIG. 6B) with the co-cured composite material assembly 60*b* comprising the co-cured composite material substrate 22*b* having a co-cured composite material substrate first side 22*b*', and a co-cured composite material substrate second side 22*b*". The co-cured UV/visible light-resistant material layer 25*b* (comprising the co-cured UV/visible light-resistant lightning strike protection material) is shown in FIG. 7 having co-cured UV/visible light-resistant material layer first side 25*b*' and a co-cured UV/visible light-resistant material layer second side 25*b*', and co-cured in position immediately adjacent to the co-cured composite material substrate 22*b* to form the co-cured composite material assembly 60*b*. FIG. 7 further shows the co-cured composite material assembly 60*b* coated with layers that can be finishing layers including a detail primer layer 32 in contact with and covering the co-cured UV/visible light-resistant material layer 25*b*, an assembly primer layer 34 in contact with and covering the detail primer layer 32, and a topcoat layer 36 (that can be a final topcoat layer) in contact with and covering the assembly primer layer 34.

Present aspects further contemplate a composite material assembly of the type shown in FIG. 7 that does not include a detail primer layer. Accordingly, FIG. 8 is an enlarged cross-sectional side representative view of a composite material system 80 according to present aspects. As shown in FIG. 8, composite material system 80 comprises a layered system further comprising the co-cured composite material assembly 60*b* (as also shown in FIG. 6B) with the co-cured composite material assembly 60*b* comprising the co-cured composite material substrate 22*b* having a co-cured composite material substrate first side 22*b*', and a co-cured composite material substrate second side 22*b*". The co-cured UV/visible light-resistant material layer 25*b* (comprising the co-cured UV/visible light-resistant lightning strike protection material) is shown in FIG. 8 having co-cured UV/visible light-resistant material layer first side 25*b*' and a co-cured UV/visible light-resistant material layer second side 25*b*', and co-cured in position immediately adjacent to the co-cured composite material substrate 22*b* to form the co-cured composite material assembly 60*b*. FIG. 8 further shows the co-cured composite material assembly 60*b* coated with layers that can be finishing layers including a primer assembly layer 34 in contact with and covering the co-cured UV/visible light-resistant material layer 25*b*, and a topcoat layer 36 (that can be a final topcoat layer) in contact with and covering the assembly primer layer 34.

According to present aspects, the combined co-curable UV/visible light-resistant material layer 25*a* (shown in FIGS. 6B, 7, and 8) can be applied to a composite material substrate as a single layer that can be a layer single ply, and can be co-cured with the composite material substrate at a temperature ranging from about 250° F. to about 370° F., to form a co-cured composite material assembly 60*b*. In addition, the inclusion of the combined co-curable UV/visible light-resistant material layer 25*a* (shown in FIGS. 6B, 7, and 8) imparts conductive properties to the composite material systems 70, 80, with the composite material assemblies, according to present aspects comprising an electrical conductivity ranging from about $2\times10^7$ Siemens/meter to $6.4\times10^7$ Siemens/meter.

Present aspects, obviate, otherwise eliminate, and/or greatly reduce the amount and thickness of a detail primer layer from the presently disclosed co-cured UV/visible light-resistant composite material assemblies and systems. That is, according to present aspects, the average thickness of the detail primer layer is greatly reduced from the amount and layer thickness of detail primer previously required for known composite material assemblies or can be obviated entirely. Such a detail primer reduction and/or elimination greatly reduces the composite material preparation complexity, and can represent a significant weight reduction, cost reduction, processing time reduction, rework time reduction, man/hour labor reduction, and required material reduction due to the scale of a large structure having large structure assemblies including, for example, aircraft.

The co-curable and/or co-cured composite material structures, assemblies, systems, according to present aspects, can be used in the formation of a large structural assembly outer surface (including, for example, large structural surfaces where lightning strike protection (LSP) would be desirable or required per industry regulations, etc.). For example, according to present aspects, the co-curable and co-cured composite material assemblies disclosed herein can be used as a structural material for, for example, an aircraft wing assembly comprising a wing assembly outer surface, a fuselage assembly, aircraft fuel tank assemblies, nacelles, aircraft electronics shielding structures, etc., to provide lightning strike protection to a selected aircraft assembly and to an aircraft comprising the selected aircraft assembly.

The co-curable composite material substrates disclosed herein can be a co-curable carbon fiber reinforced polymer composite material substrate that can further be a co-curable epoxy resin-based composite material substrate that is co-cured with the UV/visible light-resistant lightning strike protection layer to form the co-cured composite material assemblies and systems.

According to further present aspects, co-cured UV/visible light-resistant composite material assemblies and systems disclosed herein need not contain any further UV/visible light-resistant material in the UV/visible light-resistant composite material assembly in any layer other than the second UV/visible light-resistant layer and the UV/visible light-resistant lightning strike protection (LSP) layer; and in combination, or individually, the second UV/visible light-resistant layer and the UV/visible light-resistant lightning strike protection (LSP) layer has a UV/visible light transmittance value ranging from about 0% to about 20% UV/visible light transmittance for UV/visible light wavelengths ranging from about 200 nm to about 800 nm when the co-cured UV/visible light-resistant lightning strike protection layer and/or the second UV/visible light-resistant layer comprises an average thickness ranging from about 2 mils to about 6 mils Presently disclosed co-cured UV/visible light-resistant composite material assemblies do not contain a UV/visible light-resistant material in the form of, for example, UV/visible light-resistant primer layer(s) or UV/visible light-resistant paint layer(s). In other words, the second UV/visible light-resistant layer and the UV/visible light-resistant lightning strike protection (LSP) layer are solely responsible for imparting UV/visible light-resistance imparted to the UV/visible light-resistant composite material assemblies and systems (e.g., inhibiting UV/visible light radiation from passing through the second UV/visible light-resistant layer and the UV/visible light-resistant lightning strike protection (LSP) layer to the composite material substrate).

FIGS. 9A, 9B, 10A, 10B, 11A, 11B, 12A, 12B, 13, and 14 are flowcharts outlining methods for making the presently disclosed co-curable and/or co-cured UV/visible light-resistant composite material assemblies comprising the presently disclosed co-curable and co-cured UV/visible light-resistant lightning strike protection layer. Further present aspects contemplate co-curable composite materials and co-cured composite materials, assemblies comprising the co-cured composite materials, sub-assemblies comprising the co-cured composite materials, and structures comprising at least one of the assemblies and/or sub-assemblies comprising the co-cured UV/visible-resistant composite materials that are made according to the methods set forth herein, including, for example, crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle, a crewed surface water borne vehicle, an uncrewed waterborne vehicle, a crewed sub-surface water borne vehicle, an uncrewed sub-surface water borne vehicle, a satellite, and combinations thereof.

FIG. 9A illustrates a method for making a co-curable composite material assembly, with the method 900*a* including positioning and/or applying 902 a co-curable UV/visible light-resistant lightning strike protection layer onto a co-curable composite material substrate layer that can be a co-curable epoxy resin-based composite material, and that can further be a carbon fiber reinforced polymer. Method 900*a* further comprises positioning and/or applying 904 a second co-curable UV/visible light-resistant layer onto the co-curable UV/visible light-resistant lightning strike protection layer to form a co-curable composite substrate assembly, otherwise referred to equivalently as a co-curable composite material system. The co-curable composite material substrate layer can be a co-curable epoxy resin-based composite material substrate, and that can further be a carbon fiber reinforced polymer.

The co-curable composite material assembly comprising the UV/visible light-resistant lightning strike protection layer and/or the second co-curable UV/visible light-resistant layer can be of the type shown and described at least in FIG. 2A, with the co-curable UV/visible light-resistant lightning strike protection layer in immediate contact with the co-curable composite material substrate, and with the co-curable UV/visible light-resistant lightning strike protection layer positioned between (e.g., "sandwiched" between) the co-curable composite material substrate and the co-curable lightning strike protection layer. The co-curable composite material can be of the type shown and described at least in FIG. 2A herein.

FIG. 9B illustrates a method for making a co-curable composite material assembly, with the method 900*b* comprising positioning and/or applying 906 a second co-curable UV/visible light-resistant layer onto a co-curable composite material substrate, followed by positioning and/or applying 908 the co-curable UV/visible light-resistant lightning strike protection layer to the second co-curable UV/visible light-resistant layer to form a co-curable composite substrate assembly, otherwise referred to equivalently as a co-curable composite material system. The co-curable composite material substrate layer can be a co-curable epoxy resin-based composite material substrate, and that can further be a carbon fiber reinforced polymer. The co-curable composite material assembly comprising the UV/visible light-resistant lightning strike protection layer and/or the second co-curable UV/visible light-resistant layer can be of the type shown and described at least in FIG. 2B, with the co-curable UV/visible light-resistant lightning strike protection layer not in immediate contact with the co-curable composite material substrate, and with the second co-curable UV/visible light-resistant layer positioned between (e.g., "sandwiched" between) the co-curable composite material substrate and the co-curable UV/visible light-resistant lightning strike protection layer. The co-curable composite material can be of the type shown and described at least in FIG. 3A herein.

According to present aspects as outlined in the method 900*a*, 900*b* shown in FIGS. 9A, 9B respectively, one or more of the second co-curable UV/visible light-resistant layer and the co-curable UV/visible light-resistant lightning strike protection layer can each be a single ply layer. According to further present aspects, one or more of the second co-curable UV/visible light-resistant layer and the co-curable UV/visible light-resistant lightning strike protection layer can each be a plurality of plies, and with one or more of the plurality of plies and/or the single ply comprising at least one of fiberglass, carbon fibers, polyester fibers, aramid fibers, quartz, and combinations thereof.

FIG. 10A illustrates a method for making a co-curable composite material assembly as shown in FIG. 9A, with the method 1000*a* further including co-curing 909 the co-curable composite material assembly to form a co-cured UV/visible light-resistant composite material assembly of the type shown and described at least in FIG. 2B, and according to present aspects.

FIG. 10B illustrates a method for making a co-curable composite material assembly as shown in FIG. 9B, with the method 1000*b* further including co-curing 909 the co-curable composite material assembly to form a co-cured UV/visible light-resistant composite material assembly of the type shown and described at least in FIG. 3B, and according to present aspects.

FIG. 11A illustrates a method for making a co-curable composite material assembly as shown in FIG. 10A with the method 1100*a* further including applying 1102 a detail primer layer to the co-cured UV/visible light-resistant composite material assembly, applying 1104 an assembly primer layer to the detail primer layer, and applying 1106 a topcoat layer to the assembly primer layer.

FIG. 11B illustrates a method for making a co-curable composite material assembly as shown in FIG. 10B with the method 1100*b* further including applying 1102 a detail primer layer to the co-cured UV/visible light-resistant composite material assembly, applying 1104 an assembly primer layer to the detail primer layer, and applying 1106 a topcoat layer to the assembly primer layer.

FIG. 12A illustrates a method 1200*a* for making a co-curable composite material assembly as shown in FIG. 10A with the method 1200*a* further including applying 1105 an assembly primer layer to the co-cured UV/visible light-resistant composite material assembly, and applying 1106 a topcoat layer to the assembly primer layer.

FIG. 12B illustrates a method 1200*b* for making a co-curable composite material assembly as shown in FIG. 10B with the method 1200*b* further including applying 1105 an assembly primer layer to the co-cured UV/visible light-resistant composite material assembly, and applying 1106 a topcoat layer to the assembly primer layer.

As disclosed herein, the "co-curing" step 909 set forth in the methods 1000*a*, 100*b*, 1100*a*, 1100*b*, 1200*a*, 1200*b* shown in FIGS. 10A, 10B, 11A, 11B, 12A, 12B, 13, and 14, respectively can be conducted at a temperature ranging at a temperature ranging from about 250° F. to about 370° F. within a co-curing regiment determined by the materials selected for the co-curable composite material substrate and the co-curable UV/visible light-resistant lightning strike protection layer and the second co-curable UV/visible light-resistant layer, including observed ramp up periods, cool down periods, and dwell times at particular temperatures within the stated temperature range, as needed.

As described herein, while the co-curable UV/visible light-resistant lightning strike protection layer and the second co-curable UV/visible light-resistant layer can be provided as separate layers (having a single ply or a plurality of plies in each of the separate material "layers") to form the described co-curable UV/visible light-resistant composite material assemblies, further present aspects (including those described with respect to FIGS. 6A, 6B, 7, and 8 herein) contemplate combining the co-curable UV/visible light-resistant lightning strike protection material and the second co-curable UV/visible light-resistant material into a single material layer that can comprise a single ply or a plurality of plies of the combined material, and then applying the combined material layer to the co-curable composite material substrate to form the described co-curable UV/visible light-resistant composite material assemblies.

FIG. 13 illustrates a method 1300 for making a co-cured UV/visible light-resistant composite material assembly comprising applying 903 a co-curable single material layer (representing a combined single material combining the co-curable UV/visible light-resistant lightning strike protection material and the second co-curable UV/visible light-resistant material) to a co-curable composite material substrate that can be a co-curable epoxy-resin composite material substrate. Method 1300 further includes co-curing 909 the co-curable composite material assembly to form a co-cured UV/visible light-resistant composite material assembly of the type shown and described at least in FIGS. 6A, 6B, 7, and 8, and according to present aspects. Method 1300 further includes further including applying 1102 a detail primer layer to the co-cured UV/visible light-resistant composite material assembly, applying 1104 an assembly primer layer to the detail primer layer, and applying 1106 a topcoat layer to the assembly primer layer.

FIG. 14 illustrates a method 1400 for making a co-cured UV/visible light-resistant composite material assembly comprising applying 903 a co-curable single material layer (representing a combined single material combining the co-curable UV/visible light-resistant lightning strike protection material and the second co-curable UV/visible light-resistant material) to a co-curable composite material substrate that can be a co-curable epoxy-resin composite material substrate. Method 1400 further includes co-curing 909 the co-curable composite material assembly to form a co-cured UV/visible light-resistant composite material assembly of the type shown and described at least in FIGS. 6A, 6B, 7, and 8, and according to present aspects. Method 1400 further includes further including applying 1105 an assembly primer layer to the co-cured UV/visible light-resistant composite material assembly, and applying 1106 a topcoat layer to the assembly primer layer.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed is:

1. A co-curable UV/visible light-resistant lightning strike protection composite material assembly comprising:

a co-curable composite material substrate, said co-curable composite material substrate comprising a co-curable composite material substrate first side and a co-curable composite material substrate second side;

a co-curable UV/visible light-resistant lightning strike protection layer;

a second co-curable UV/visible light-resistant single ply layer, said second co-curable UV/visible light-resistant single ply layer comprising a second co-curable UV/visible light-resistant layer first side and a second co-curable UV/visible light-resistant layer second side, said second co-curable UV/visible light-resistant single ply layer comprising at least one of fiberglass fibers, carbon fibers, polyester fibers, aramid fibers, boron fibers, quartz, and combinations thereof;

wherein the co-curable composite material substrate first side is in direct contact with the second co-curable UV/visible light-resistant single ply layer;

wherein the co-curable composite material substrate is co-curable with the co-curable UV/visible light-resistant lightning strike protection layer and is further co-curable with the second co-curable UV/visible light-resistant single ply layer at a temperature ranging from about 250° F. to about 370° F.;

wherein the co-curable UV/visible light-resistant lightning strike protection layer and the second co-curable UV/visible light-resistant single ply layer both have a UV/visible light transmittance value ranging from about 0% to about 20% UV/visible light transmittance for UV/visible light wavelengths ranging from about 200 nm to about 800 nm when the co-cured UV/visible light-resistant lightning strike protection layer and the second co-curable UV/visible light-resistant single ply layer each comprise an average thickness ranging from about 2 mils to about 6 mils;

wherein the co-cured UV/visible light-resistant lightning strike protection layer comprises an electrical conductivity ranging from $2\times10^7$ Siemens/meter to $6.4\times10^7$ Siemens/meter;

wherein the second co-curable UV/visible light-resistant-single ply layer completely covers the co-curable composite material substrate first side;

wherein the second co-curable UV/visible light-resistant-single ply layer in combination with the co-curable UV/visible light-resistant lightning strike protection layer are together solely responsible for imparting 100% of the UV/visible light-resistance to the co-curable UV/visible light-resistant composite material assembly; and wherein, in combination, the co-curable composite material substrate, the co-curable UV/visible light-resistant lightning strike protection layer, and the second co-curable UV/visible light-resistant single ply layer are configured to form the co-curable UV/visible light-resistant lightning strike protection composite material assembly.

2. The co-curable UV/visible light-resistant lightning strike protection composite material assembly of claim 1, wherein the co-curable composite material substrate comprises a carbon fiber reinforced polymer.

3. The co-curable UV/visible light-resistant lightning strike protection composite material assembly of claim 1, wherein the co-curable composite material substrate comprises an epoxy resin-based compound, said co-curable composite material substrate further comprising at least one of: carbon fibers, boron fibers, aramid fibers, fiberglass fibers, polyester fibers, and combinations thereof.

4. The co-curable UV/visible light-resistant lightning strike protection composite material assembly of claim 1, wherein the co-curable composite material substrate comprises a plurality of carbon fiber reinforced polymer prepregs.

5. The co-curable UV/visible light-resistant lightning strike protection composite material assembly of claim 1, wherein the second co-curable UV/visible light-resistant single ply layer is located immediately adjacent to the co-curable composite material substrate, said second co-curable UV/visible light-resistant single ply layer further configured to be located between the co-curable composite material substrate and the co-curable UV/visible light-resistant lightning strike protection layer.

6. The co-curable UV/visible light-resistant lightning strike protection composite material assembly of claim 1, wherein the second co-curable UV/visible light-resistant single ply layer is a separate layer in the co-curable composite material assembly.

7. The co-curable UV/visible light-resistant lightning strike protection composite material assembly of claim 1, wherein at least one of the co-curable UV/visible light-resistant lightning strike protection layer and the second co-curable UV/visible light-resistant single ply layer comprises at least one of fiberglass, carbon fibers, polyester fibers, aramid fibers, quartz, and combinations thereof.

8. The co-curable UV/visible light-resistant lightning strike protection composite material assembly of claim 1, wherein at least one of the co-curable UV/visible light-resistant lightning strike protection layer and the second co-curable UV/visible light-resistant single ply layer is a co-curable UV/visible light-resistant fiberglass-containing layer.

9. A co-cured UV/visible light-resistant lightning strike protection composite material assembly comprising:

a co-cured composite material substrate, said co-cured composite material substrate comprising a co-cured composite material substrate first side and a co-cured composite material substrate second side;

a second co-cured UV/visible light-resistant single ply layer, said second co-cured UV/visible light-resistant single ply layer comprising a second co-cured UV/visible light-resistant layer first side and a second co-cured UV/visible light-resistant layer second side, said second co-cured UV/visible light-resistant single ply layer comprising at least one of fiberglass fibers, carbon fibers, polyester fibers, aramid fibers, boron fibers, quartz, and combinations thereof;

a co-cured UV/visible light-resistant lightning strike protection layer disposed onto the second co-cured UV/visible light-resistant layer first side;

wherein the second co-cured UV/visible light-resistant single ply layer directly contacts and completely covers the co-curable composite material substrate first side;

wherein the co-cured UV/visible light-resistant lightning strike protection layer and the second co-cured UV/visible light-resistant single ply layer both have a UV/visible light transmittance value ranging from about 0% to about 20% UV/visible light transmittance for UV/visible light wavelengths ranging from about 200 nm to about 800 nm when each of the co-cured UV/visible light-resistant lightning strike protection layer and the second co-cured UV/visible light-resistant single ply layer each comprise an average thickness ranging from about 2 mils to about 6 mils;

wherein said co-cured UV/visible light-resistant lightning strike protection layer in combination with the second co-cured UV/visible light-resistant single ply layer exclusively imparts 100% of the UV/visible light protection to the co-cured UV/visible light-resistant lightning strike protection composite material assembly;

wherein the co-cured UV/visible light-resistant lightning strike protection layer comprises an electrical conductivity ranging from $2\times10^7$ Siemens/meter to $6.4\times10^7$ Siemens/meter; and wherein, in combination, the co-cured composite material substrate, the co-cured UV/visible light-resistant lightning strike protection layer, and the second co-cured UV/visible light-resistant single ply layer are configured to form the co-cured UV/visible light-resistant lightning strike protection composite material assembly.

10. The co-cured UV/visible light-resistant lightning strike protection composite material assembly of claim 9, wherein the co-cured composite material substrate is co-cured with the co-cured UV/visible light-resistant lightning strike protection layer and the co-cured composite material substrate are further co-cured with the second co-cured UV/visible light-resistant single ply layer at a temperature ranging from about 250° F. to about 370° F.

11. The co-cured UV/visible light-resistant lightning strike protection composite material assembly of claim 9, wherein the co-cured composite material substrate comprises a carbon fiber reinforced polymer.

12. The co-cured UV/visible light-resistant lightning strike protection composite material assembly of claim 9, wherein the co-cured composite material substrate comprises an epoxy resin-based compound, said co-cured composite material substrate further comprising at least one of: carbon fibers, boron fibers, aramid fibers, fiberglass fibers, polyester fibers, and combinations thereof.

13. The co-cured UV/visible light-resistant lightning strike protection composite material assembly of claim 9, further comprising an assembly primer layer disposed onto the co-cured UV/visible light-resistant lightning strike protection layer, said co-cured UV/visible light-resistant lightning strike protection composite material assembly further comprising a topcoat layer, said topcoat layer disposed onto the assembly primer layer.

14. The co-cured UV/visible light-resistant lightning strike protection composite material assembly of claim 13, further comprising a detail primer layer positioned between the co-cured UV/visible light-resistant lightning strike protection layer and the primer assembly layer.

15. The co-cured UV/visible light-resistant lightning strike protection composite material assembly of claim 9, wherein the co-cured second UV/visible light-resistant single ply layer is located between the co-cured composite material substrate and the co-cured UV/visible light-resistant lightning strike protection layer.

16. The co-cured UV/visible light-resistant lightning strike protection composite material assembly of claim 9, further comprising an assembly primer layer disposed onto the co-cured UV/visible light-resistant lightning strike protection layer, and said co-cured UV/visible light-resistant lightning strike protection composite material assembly further comprising a topcoat layer disposed onto the assembly primer layer.

17. The co-cured UV/visible light-resistant lightning strike protection composite material assembly of claim 16, further comprising a detail primer layer disposed between the assembly primer layer and the co-cured UV/visible light-resistant lightning strike protection layer.

18. The co-cured UV/visible light-resistant lightning strike protection composite material assembly of claim 9, wherein at least one of the UV/visible-light-resistant lightning strike protection layer and the second co-cured UV/visible light-resistant single ply layer comprises at least one of fiberglass, carbon fibers, polyester fibers, aramid fibers, quartz, and combinations thereof.

19. The co-cured UV/visible light-resistant lightning strike protection composite material assembly of claim 9 wherein at least one of the co-cured UV/visible light-resistant lightning strike protection layer and the second co-cured UV/visible light-resistant single ply layer comprises a co-cured UV/visible light-resistant fiberglass-containing layer.

20. A vehicle comprising the co-cured UV/visible light-resistant lightning strike protection composite material assembly of claim 9, said vehicle is selected from the group consisting of:

a crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle; a crewed surface water borne vehicle, an uncrewed waterborne vehicle, a crewed sub-surface water borne vehicle, an uncrewed sub-surface water borne vehicle, a satellite, and combinations thereof.

21. A vehicle comprising the co-cured UV/visible light-resistant lightning strike protection composite material assembly of claim 15, said vehicle is selected from the group consisting of:

a crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle; a crewed surface water borne vehicle, an uncrewed waterborne vehicle, a crewed sub-surface water borne vehicle, an uncrewed sub-surface water borne vehicle, a satellite, and combinations thereof.

22. A method of making a co-curable UV/visible light-resistant lightning strike protection composite material assembly, the method comprising:

providing a co-curable composite material substrate, said co-curable composite material substrate comprising a co-curable composite material substrate first side and a co-curable composite material substrate second side;

disposing a second co-curable UV/visible light-resistant single ply layer onto the co-curable composite material substrate first side, said second co-curable UV/visible light-resistant single ply layer comprising a second co-curable UV/visible light-resistant layer first side and a second co-curable UV/visible light-resistant layer second side, said second co-curable UV/visible light-resistant single ply layer comprising at least one of fiberglass fibers, carbon fibers, polyester fibers, aramid fibers, boron fibers, quartz, and combinations thereof;

disposing a co-curable UV/visible light-resistant lightning strike protection layer immediately adjacent to the second co-curable UV/visible light layer first side, said co-curable UV/visible light-resistant lightning strike protection layer comprising at least one of fiberglass fibers, carbon fibers, polyester fibers, aramid fibers, boron fibers, quartz, and combinations thereof to form the co-curable composite UV/visible light-resistant lightning strike protection material lightning strike protection assembly;

wherein the co-curable composite material substrate is co-curable with both the co-curable UV/visible light-resistant lightning strike protection layer and the second co-curable UV/visible light-resistant single ply layer at a temperature ranging from about 250° F. to about 370° F.;

wherein the co-curable UV/visible light-resistant lightning strike protection layer and the second co-curable UV/visible light-resistant single ply layer each have a UV/visible light transmittance value ranging from about 0% to about 20% UV/visible light transmittance for UV/visible light wavelengths ranging from about 200 nm to about 800 nm when each of the co-cured UV/visible light-resistant lightning strike protection layer and the second co-curable UV/visible light-resistant single ply layer comprises an average thickness ranging from about 2 mils to about 6 mils;

wherein the co-curable UV/visible light-resistant lightning strike protection layer comprises an electrical conductivity ranging from $2\times10^7$ Siemens/meter to $6.4\times10^7$ Siemens/meter;

wherein the second co-curable UV/visible light-resistant-single ply layer completely covers the co-curable composite material substrate first side; and wherein the second co-curable UV/visible light-resistant-single ply layer in combination with the co-curable UV/visible light-resistant lightning strike protection single ply layer is solely responsible for imparting 100% of the UV/visible light-resistance to the co-curable UV/visible light-resistant lightning strike protection composite material assembly.

23. The method of claim 22, wherein the second co-curable UV/visible light-resistant single ply layer in combination with the co-curable UV/visible light-resistant lightning strike protection layer exclusively impart imparts UV/visible light protection to the co-curable UV/visible light-resistant lightning strike protection composite material assembly.

24. The method of claim 23, further comprising:

positioning said second co-curable UV/visible light-resistant single ply layer between the co-curable composite material substrate and the co-curable UV/visible light-resistant lightning strike protection layer.

25. A method of making a co-cured UV/visible light-resistant lightning strike protection composite material assembly, said method comprising:

providing a co-curable composite material substrate, said co-curable composite material substrate comprising a co-curable composite material substrate first side and a co-curable composite material substrate second side;

disposing a second co-curable UV/visible light-resistant single ply layer onto the co-curable composite material substrate first side, said second co-curable UV/visible light-resistant single ply layer comprising a second co-curable UV/visible light-resistant layer first side and a second co-curable UV/visible light-resistant layer second side, said second co-curable UV/visible light-resistant single ply layer comprising at least one of fiberglass fibers, carbon fibers, polyester fibers, aramid fibers, boron fibers, quartz, and combinations thereof, disposing a co-curable UV/visible light-resistant lightning strike protection layer immediately adjacent to the second co-curable UV/visible light-resistant layer first side, said co-curable UV/visible light-resistant lightning strike protection layer comprising at least one of fiberglass fibers, carbon fibers, polyester fibers, aramid fibers, boron fibers, quartz, and combinations thereof to form the co-curable UV/visible light-resistant lightning strike protection composite material assembly;

co-curing the co-curable composite material substrate, the co-curable UV/visible light-resistant lightning strike protection layer, and the second co-curable UV/visible light-resistant single ply layer at a temperature ranging from about 250° F. to about 370° F. to form the co-cured UV/visible light-resistant lightning strike protection composite material assembly; and wherein each of the co-cured UV/visible light-resistant lightning strike protection layer and the second co-curable UV/visible light-resistant single ply layer has a UV/visible light transmittance value ranging from about 0% to about 20% UV/visible light transmittance for UV/visible light wavelengths ranging from about 200 nm to about 800 nm when each of the co-cured UV/visible light-resistant lightning strike protection layer and the second co-curable UV/visible light-resistant single ply layer comprises an average thickness ranging from about 2 mils to about 6 mils;

wherein the co-cured UV/visible light-resistant lightning strike protection layer comprises an electrical conductivity ranging from $2\times10^{7}$ Siemens/meter to $6.4\times10^{7}$ Siemens/meter;

wherein the second co-cured UV/visible light-resistant-single ply layer completely covers the co-cured composite material substrate first side; and wherein the second co-cured UV/visible light-resistant-single ply layer in combination with the co-cured UV/visible light-resistant lightning strike protection layer is solely responsible for imparting 100% of the UV/visible light-resistance to the co-cured UV/visible light-resistant lightning strike protection composite material assembly.

26. The method of claim 25, wherein the second co-curable UV/visible light-resistant single ply layer in combination with the co-curable UV/visible light-resistant lightning strike protection layer exclusively imparts 100% of the UV/visible light protection to the co-cured UV/visible light-resistant lightning strike protection composite material assembly.

27. The method of claim 26, further comprising:

positioning said second co-curable UV/visible light-resistant single ply layer between the co-curable composite material substrate and the co-curable UV/visible light-resistant lightning strike protection layer.

* * * * *